US010744634B2

(12) United States Patent
Kakiuchi et al.

(10) Patent No.: US 10,744,634 B2
(45) Date of Patent: Aug. 18, 2020

(54) IMPACT TOOL

(71) Applicant: MAKITA CORPORATION, Anjo-shi, Aichi (JP)

(72) Inventors: Yasuhiro Kakiuchi, Anjo (JP); Hajime Takeuchi, Anjo (JP); Masanori Furusawa, Anjo (JP); Yoshiro Tada, Anjo (JP)

(73) Assignee: MAKITA CORPORATION, Anjo-shi (JP)

( * ) Notice: Subject to any disclaimer, the term of this patent is extended or adjusted under 35 U.S.C. 154(b) by 279 days.

(21) Appl. No.: 15/808,195

(22) Filed: Nov. 9, 2017

(65) Prior Publication Data

US 2018/0065240 A1 Mar. 8, 2018

Related U.S. Application Data

(62) Division of application No. 14/137,043, filed on Dec. 20, 2013, now Pat. No. 9,950,418.

(30) Foreign Application Priority Data

Dec. 25, 2012 (JP) ................................ 2012-281540
Dec. 25, 2012 (JP) ................................ 2012-281542

(51) Int. Cl.
*B25F 5/02* (2006.01)
*B25D 17/00* (2006.01)
(Continued)

(52) U.S. Cl.
CPC ................ *B25F 5/02* (2013.01); *B25D 17/00* (2013.01); *B25D 17/20* (2013.01); *B25D 17/24* (2013.01);
(Continued)

(58) Field of Classification Search
CPC ........ B25D 11/04; B25D 17/00; B25D 17/20; B25D 17/24; B25D 2217/0065;
(Continued)

(56) References Cited

U.S. PATENT DOCUMENTS 3,114,421 A * 12/1963 McCloud .............. B25D 16/00 173/14
4,450,919 A 5/1984 Cousineau
(Continued)

FOREIGN PATENT DOCUMENTS

EP 2100698 A2 9/2009
EP 2418051 A1 2/2012
(Continued)

OTHER PUBLICATIONS

Jun. 3, 2015 Office Action issued in Chinese Patent Application No. 201310723930.5.
(Continued)

*Primary Examiner* — Nathaniel C Chukwurah
*Assistant Examiner* — Lucas E. A. Palmer
(74) *Attorney, Agent, or Firm* — Oliff PLC

(57) ABSTRACT

An impact tool is provided which has a driving mechanism, that drives a tool bit, a motor that drives the driving mechanism, an inner housing that houses the driving mechanism, an outer housing that has an internal space for housing the inner housing and the motor, an opening that leads from the outside to the internal space of the outer housing, and a covering member that covers the opening.

17 Claims, 17 Drawing Sheets

(51) Int. Cl.
*B25D 17/20* (2006.01)
*B25D 17/24* (2006.01)
*B25F 5/00* (2006.01)

(52) U.S. Cl.
CPC ...... *B25F 5/006* (2013.01); *B25D 2217/0065* (2013.01); *B25D 2250/051* (2013.01); *B25D 2250/065* (2013.01); *B25D 2250/121* (2013.01); *B25D 2250/361* (2013.01)

(58) Field of Classification Search
CPC ........ B25D 2250/051; B25D 2250/065; B25D 2250/121; B25D 2250/361; B25F 5/006; B25F 5/02
USPC .......................................................... 173/117
See application file for complete search history.

(56) References Cited

U.S. PATENT DOCUMENTS

| | | | | | |
|---|---|---|---|---|---|
| 4,664,394 | A | 5/1987 | Theissig et al. | | |
| 6,902,013 | B2 * | 6/2005 | Aeberhard | B25F 5/001 | 173/213 |
| 7,051,820 | B2 * | 5/2006 | Stirm | B25D 16/00 | 173/109 |
| 7,143,842 | B2 * | 12/2006 | Ikuta | B25D 11/005 | 173/201 |
| 8,322,456 | B2 * | 12/2012 | Pozgay | B25B 21/00 | 173/1 |
| 8,966,773 | B2 | 3/2015 | Gregorich | | |
| 2002/0125023 | A1 | 9/2002 | Hanke et al. | | |
| 2003/0121679 | A1 * | 7/2003 | Taga | B25B 21/02 | 173/93.5 |
| 2004/0194987 | A1 | 10/2004 | Hanke et al. | | |
| 2004/0211576 | A1 * | 10/2004 | Milbourne | B23B 45/008 | 173/48 |
| 2005/0257945 | A1 * | 11/2005 | Justis | B25F 5/02 | 173/217 |
| 2005/0269117 | A1 * | 12/2005 | Sato | B25D 17/11 | 173/132 |
| 2007/0000677 | A1 * | 1/2007 | Nakashima | B25D 17/24 | 173/217 |
| 2007/0044984 | A1 * | 3/2007 | Fischer | B25D 17/043 | 173/217 |
| 2007/0144310 | A1 | 6/2007 | Pozgay et al. | | |
| 2007/0209814 | A1 * | 9/2007 | Furusawa | B23Q 3/12 | 173/48 |
| 2007/0261871 | A1 | 11/2007 | Ohlendorf | | |
| 2007/0295522 | A1 * | 12/2007 | Bohne | B25D 17/043 | 173/162.2 |
| 2008/0283264 | A1 * | 11/2008 | Ikuta | B25D 11/125 | 173/211 |
| 2009/0223691 | A1 * | 9/2009 | Ikuta | B25D 17/24 | 173/117 |
| 2009/0236110 | A1 * | 9/2009 | Iwakami | B25D 11/005 | 173/122 |
| 2009/0314507 | A1 * | 12/2009 | Iwakami | B25D 17/043 | 173/162.2 |
| 2009/0321101 | A1 * | 12/2009 | Furusawa | B25D 17/043 | 173/162.2 |
| 2010/0038105 | A1 * | 2/2010 | Kikuchi | B25D 17/24 | 173/162.2 |
| 2010/0051304 | A1 * | 3/2010 | Aoki | B25D 17/24 | 173/114 |
| 2010/0181087 | A1 * | 7/2010 | Schoeps | B25F 5/02 | 173/200 |
| 2011/0011608 | A1 * | 1/2011 | Saur | B25D 11/062 | 173/162.2 |
| 2011/0083868 | A1 * | 4/2011 | Nishikimi | B25F 5/02 | 173/171 |
| 2011/0100665 | A1 * | 5/2011 | Nakashima | B23D 51/01 | 173/162.2 |
| 2011/0168422 | A1 * | 7/2011 | Fujiwara | B25F 5/008 | 173/217 |
| 2011/0203826 | A1 * | 8/2011 | Hosokawa | B25F 5/02 | 173/217 |
| 2011/0290517 | A1 * | 12/2011 | Takeuchi | B25D 17/00 | 173/90 |
| 2011/0297407 | A1 | 12/2011 | Sakai | | |
| 2011/0303726 | A1 | 12/2011 | Blessing et al. | | |
| 2011/0303733 | A1 | 12/2011 | Fielitz et al. | | |
| 2011/0308828 | A1 | 12/2011 | Shinma et al. | | |
| 2012/0031638 | A1 * | 2/2012 | Kamegai | B25D 17/245 | 173/162.2 |
| 2012/0067605 | A1 * | 3/2012 | Furusawa | B25D 17/043 | 173/162.2 |
| 2012/0090863 | A1 * | 4/2012 | Puzio | B25B 21/02 | 173/2 |
| 2012/0097410 | A1 * | 4/2012 | Honsa | B25D 17/24 | 173/162.2 |
| 2012/0160533 | A1 * | 6/2012 | Kamegai | B25D 17/24 | 173/162.2 |
| 2012/0255753 | A1 * | 10/2012 | Kuhnle | B25D 17/24 | 173/162.2 |
| 2012/0279740 | A1 * | 11/2012 | Furusawa | B25D 17/043 | 173/79 |
| 2012/0315103 | A1 * | 12/2012 | Aoki | B25D 17/088 | 408/239 R |
| 2012/0318551 | A1 * | 12/2012 | Kuhnle | B25D 17/24 | 173/162.2 |
| 2013/0043052 | A1 * | 2/2013 | Harcar | B25D 17/043 | 173/162.2 |
| 2013/0153253 | A1 * | 6/2013 | Ludy | B25D 11/04 | 173/104 |
| 2013/0168121 | A1 * | 7/2013 | Ullrich | B25D 17/00 | 173/213 |

FOREIGN PATENT DOCUMENTS

| | | | |
|---|---|---|---|
| FR | 2488179 | A1 | 2/1982 |
| JP | S55-151482 | U | 10/1980 |
| JP | S59-76218 | A | 5/1984 |
| JP | S61-81888 | U | 5/1986 |
| JP | 2007-196337 | A | 8/2007 |
| JP | 2007-296634 | A | 11/2007 |
| JP | 2009-248241 | A | 10/2009 |
| JP | 2010-144921 | A | 7/2010 |
| JP | 2010-247239 | A | 11/2010 |
| WO | 2006/113333 | A2 | 10/2006 |

OTHER PUBLICATIONS

Sep. 16, 2016 Office Action Issued in U.S. Appl. No. 14/137,043.
May 11, 2016 Office Action issued in Japanese Application No. 2012-281542.
May 11, 2016 Office Action issued in Japanese Application No. 2012-281540.
May 24, 2017 Extended European Search Report issued in European Patent Application No. 17157860.2.
Sep. 20, 2017 Office Action issued in U.S. Appl. No. 14/137,043.
Feb. 23, 2017 Office Action issued in U.S. Appl. No. 14/137,043.
Apr. 14, 2014 Search Report issued in European Patent Application No. 13199135.8.
U.S. Appl. No. 14/137,043, filed Dec. 20, 2013 in the name of Kakiuchi et al.
Dec. 6, 2017 Office Action issued in Russian Patent Application No. 2013157587.

* cited by examiner

IMPACT TOOL

CROSS REFERENCE TO RELATED APPLICATION

The present application is a Division of U.S. patent application Ser. No. 14/137,043 filed Dec. 20, 2013, which claims the benefit of Japanese Patent Applications No. 2012-281540 filed on Dec. 25, 2012 and No. 2012-281542 filed on Dec. 25, 2012, the entire contents of which are herein incorporated by reference.

BACKGROUND OF THE INVENTION

Field of the Invention

The present invention relates to an impact tool which performs a predetermined operation on a workpiece by at least linear movement of a tool bit in its axial direction.

Description of Related Art

Japanese non-examined laid-open Patent Publication No. 2010-247239 discloses an impact tool having an inner housing that houses a driving mechanism for driving a tool bit and an outer housing that houses the inner housing. The outer housing of this impact tool is configured as a vibration-proofing housing in which the outer housing is elastically connected to the inner housing via an elastic member so as to be allowed to move relative to the inner housing.

SUMMARY OF THE INVENTION

In the impact tool having the outer housing having an opening which is open to the outside, dust generated during operation may enter the outer housing through the opening and adversely affect members disposed within the outer housing. Specifically, with the construction in which a motor is disposed within the outer housing, dust enters the outer housing and adversely affects the motor.

Accordingly, an object of the invention is to provide an improved impact tool in which an inside of an outer housing is protected from dust.

The above-described object is achieved by the claimed invention. According to a preferred embodiment of the invention, an impact tool is provided which performs a hammering operation on a workpiece by at least linear movement of a tool bit in an axial direction of the tool bit. The impact tool has a driving mechanism that drives the tool bit, an electric motor that drives the driving mechanism, an inner housing that houses the driving mechanism, an outer housing that houses the inner housing and the motor, and a covering member that covers an opening leading from outside to inside of the outer housing. The "opening" preferably includes a hole and a clearance. Further, in order to "cover the opening by the covering member", preferably, the covering member is detachably mounted onto the outer housing so as to cover the opening.

According to the invention, the covering member covers the opening leading from outside to inside of the outer housing. Therefore, dust generated during operation using the impact tool is prevented from entering the outer housing through the opening. Thus, the motor housed within the outer housing is protected from dust.

According to a further aspect of the impact tool of the invention, the outer housing has a first outer housing and a second outer housing which is formed separately from the first outer housing. The first outer housing houses the inner housing and the second outer housing houses the motor.

According to this aspect, the outer housing is provided with the first outer housing and the second outer housing. Therefore, for example, when the first outer housing and the second outer housing are molded of synthetic resin, the degree of freedom in molding is enhanced. For example, they may be molded of different materials or in different colors.

According to a further aspect of the impact tool of the invention, the impact tool comprises an elastic member which is disposed between the first outer housing and the inner housing. Further, the first outer housing is relatively movably connected to the inner housing via the elastic member.

According to this aspect, the first outer housing is elastically connected to the inner housing via the elastic member and thus configured as a vibration-proofing housing. Accordingly, transmission of vibration from the inner housing to the first outer housing is reduced.

According to a further aspect of the impact tool of the invention, a handle designed to be held by a user is formed on part of the first outer housing. Namely, the first outer housing connected to the inner housing via the elastic member forms a vibration-proofing housing. Accordingly, vibration which is caused on the handle during operation is reduced, so that load on a user's hand is alleviated.

According to a further aspect of the impact tool of the invention, the opening is provided by a through hole formed on the first outer housing. Typically, the tool bit or a tool bit holding portion which holds the tool bit is held and supported by the inner housing so as to be exposed via the through hole.

According to a further aspect of the impact tool of the invention, the driving mechanism has a motion converting mechanism that converts rotation of the electric motor into linear motion and a striking mechanism that is driven by the motion converting mechanism and strikes the tool bit. The inner housing has a first inner housing, a second inner housing that is formed separately from the first inner housing and a connecting member that connects the first inner housing and the second inner housing. The first inner housing houses the motion converting mechanism and the second inner housing houses the striking mechanism. The opening is configured as a through hole which allows access to the connecting member from outside of the outer housing.

According to this aspect, the covering member prevents dust from entering an internal space of the outer housing through the through hole, so that the motor housed within the outer housing is protected from dust.

According to a further aspect of the impact tool of the invention, the opening is open toward a front end of the attached tool bit, and the covering member is disposed outside the outer housing so as to cover the opening.

In an operation which is performed on a ceiling of a building by the impact tool in an overhead position or with the tip end of the tool bit pointing upward, if the opening is open toward the front end of the tool bit, dust is more likely to enter through the opening. However, according to this aspect, the opening is covered by the covering member disposed outside the outer housing. Thus, dust is reliably prevented from entering through the opening.

According to a further aspect of the impact tool of the invention, the opening is provided with a plurality of the opening parts that are provided and arranged in a circumferential direction of the tool bit. Further, the covering member is formed by a single member which covers all of the opening parts.

According to this aspect, a plurality of the opening parts are covered by the covering member formed of a single member, so that the covering member is made simpler in structure.

According to other aspect of the impact tool of the invention, an impact tool is provided which performs a hammering operation on a workpiece by at least linear movement of a tool bit in an axial direction of the tool bit. The impact tool has a driving mechanism that drives the tool bit, an electric motor that drives the driving mechanism, a housing that forms an outer shell of the impact tool. The housing has a first housing that houses the driving mechanism and a second housing that houses the electric motor. The first housing has a first contact region for contact with the second housing, and the second housing has a second contact region for contact with the first housing. Further, the first contact region and the second contact region are slidable relative to each other and are formed of different materials to each other.

According to the invention, by provision of the construction in which the first contact region and the second contact region are formed of different materials to each other, the sliding surfaces of the first contact region and the second contact region are prevented from being welded by friction heat during operation of the impact tool. For example, if the first housing is formed of synthetic resin, welding of the sliding surfaces are prevented by forming the second housing of a material other than synthetic resin, such as metal, or different synthetic resin having a melting point different from synthetic resin of the first housing.

According to a further aspect of the impact tool of the invention, the second housing includes a first member that forms the second contact region and a second member that houses the motor.

According to this aspect, only the first member of the second housing that forms the second contact region is formed of a different material from the material of the first housing, and the second member as most of the second housing, that houses the motor, is formed of the same kind of material as the first housing.

According to a further aspect of the impact tool of the invention, the first member is formed by a ring-like member having a cut. Further, the "ring-like member having a cut" in the invention represents a member having a cut at which the ring becomes discontinuous in its circumferential direction, or more specifically, a C- or U-shaped or horseshoe-shaped member.

According to this aspect, the first member is provided as the ring-like member having the cut. Therefore, the ring-like member is opened outward from the cut by utilizing elastic deformation and fitted onto the second member, so that the ring-like member is easily mounted onto the second member.

According to a further aspect of the invention, the impact tool has an inner housing that houses the driving mechanism. The inner housing is housed in the first housing. Further, the impact tool has an elastic member that is disposed between the first housing and the inner housing. Further, the first housing is connected to the inner housing via the elastic member so as to be allowed to move relative to the inner housing.

According to this aspect, the first housing is connected to the inner housing via the elastic member so as to be allowed to move relative to the inner housing, so that the vibration-proofing housing is provided. Specifically, the first housing which is provided as the vibration-proofing housing is slid against the second housing. Therefore, the sliding surfaces of the first contact region of the first housing and the second contact region of the second housing are prevented from being welded by friction heat.

According to a further aspect of the impact tool of the invention, the inner housing has a first guide member, and the first housing has a second guide member that is slidable relative to the first guide member. Further, the first guide member and the second guide member are formed of different materials to each other. Specifically, it is preferred that one of the first guide member and the second guide member is formed of synthetic resin and the other is formed of metal.

According to this aspect, the first guide member and the second guide member are formed of different materials to each other. Therefore, when the first housing is moved relative to the inner housing during operation of the impact tool, the sliding surfaces of the first guide member and the second guide member are prevented from being welded by friction heat.

According to a further aspect of the impact tool of the invention, the first contact region has a first extending surface that extends in the axial direction of the tool bit, and a second extending surface that extends in a direction crossing the axial direction. Further, the second contact region has a third extending surface that extends in the axial direction of the tool bit, and a fourth extending surface that extends in a direction crossing the axial direction. The first housing and the second housing are disposed such that the first extending surface and the third extending surface slide relative to each other, and the second extending surface and the fourth extending surface slide relative to each other.

According to this aspect, the sliding surfaces are provided not only in the axial direction of the tool bit but also in the direction crossing the axial direction, so that the sliding surfaces have a large area. By provision of this construction, sliding movement of the first housing relative to the second housing are stabilized and wear of the sliding surfaces is reduced.

According to a further aspect of the impact tool of the invention, the first housing has a third guide member, and the second housing has a fourth guide member that is slidable relative to the third guide member. Further, the third guide member and the fourth guide member are formed of different materials to each other. Specifically, it is preferred that one of the third guide member and the fourth guide member is formed of synthetic resin and the other is formed of metal.

According to this aspect, the third guide member and the fourth guide member are formed of different materials. With this construction, when the first housing is moved relative to the second housing during operation of the impact tool, the sliding surfaces of the guide members are prevented from being welded by friction heat.

Accordingly, an improved impact tool is provided in which the inside of an outer housing is protected from dust.

Other objects, features and advantages of the invention will be readily understood after reading the following detailed description together with the accompanying drawings and the claims.

DETAILED DESCRIPTION OF THE INVENTION

Each of the additional features and method steps disclosed above and below may be utilized separately or in conjunction with other features and method steps to provide and manufacture improved impact tools and method for using such the impact tools and devices utilized therein. Representative examples of the invention, which examples utilized many of these additional features and method steps in conjunction, will now be described in detail with reference to the drawings. This detailed description is merely intended to teach a person skilled in the art further details for practicing preferred aspects of the present teachings and is not intended to limit the scope of the invention. Only the claims define the scope of the claimed invention. Therefore, combinations of features and steps disclosed within the following detailed description may not be necessary to practice the invention in the broadest sense, and are instead taught merely to particularly describe some representative examples of the invention, which detailed description will now be given with reference to the accompanying drawings.

First Embodiment

Figure 1:
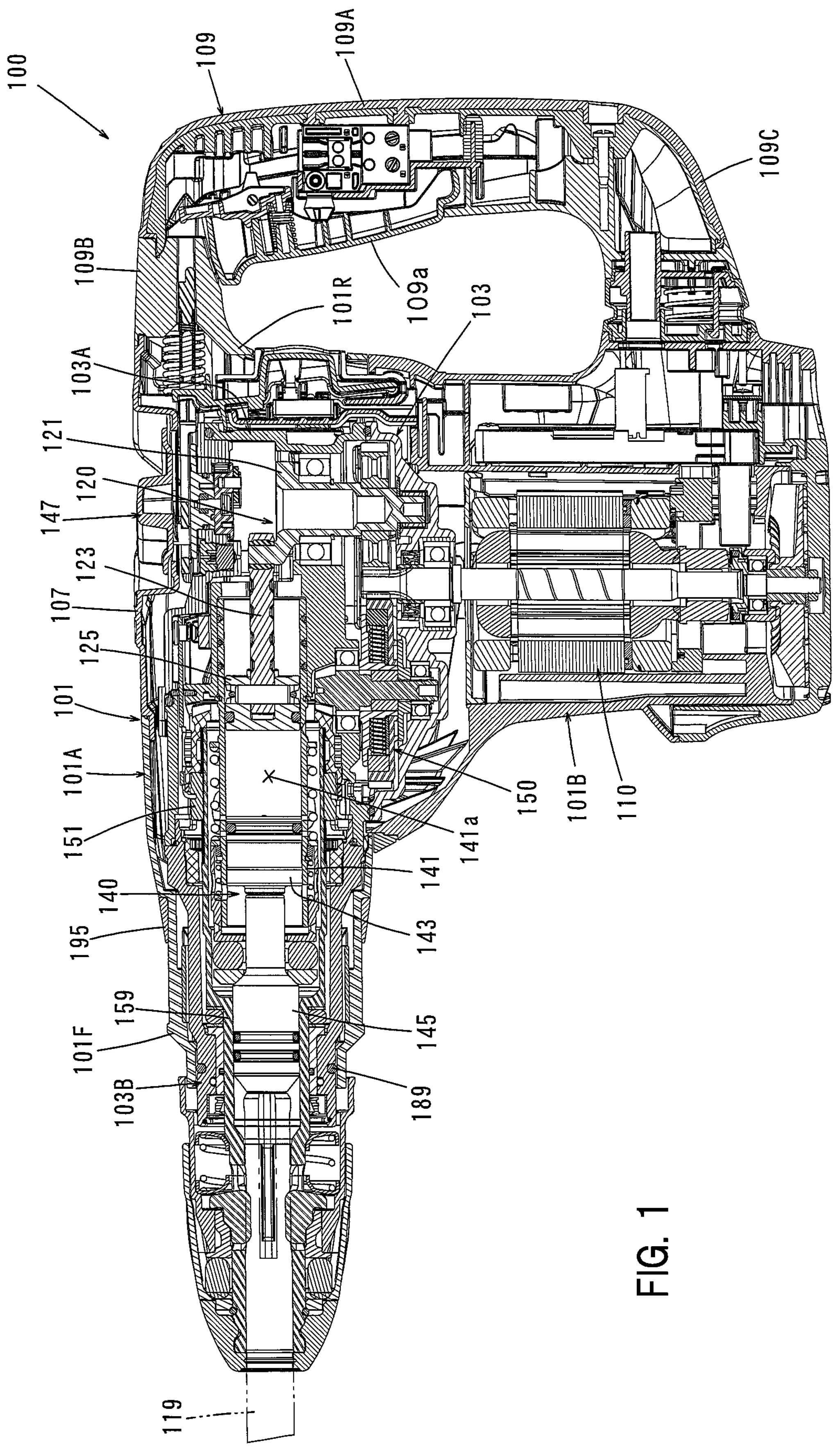
FIG. 1 is a sectional view showing an entire hammer drill according to this embodiment.
Figure 2:
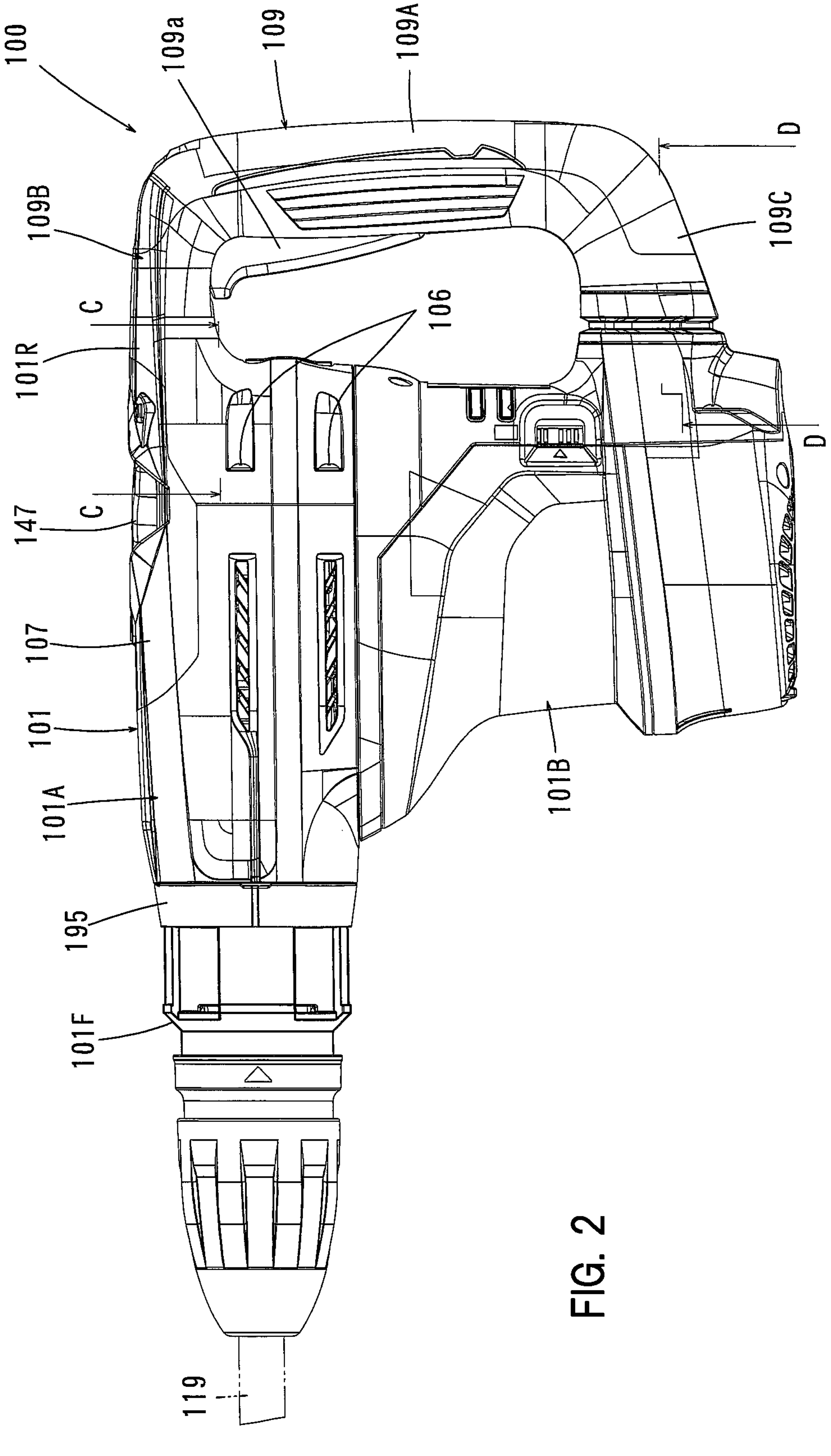
FIG. 2 is an external view of the hammer drill.

A first embodiment of the invention is now described with reference to FIGS. 1 to 13. In the first embodiment, an electric hammer drill 100 is described as a representative example of an impact tool. As shown in FIGS. 1 and 2, the hammer drill 100 is an impact tool which has a hammer bit 119 attached thereto and performs a drilling or chipping operation on a workpiece by causing the hammer bit 119 to linearly move in its axial direction and rotate around its axis. The hammer bit 119 is a feature that corresponds to the "tool bit" according to invention.

As shown in FIGS. 1 and 2, the hammer drill 100 has an outer housing 101 that forms an outer shell of the hammer drill 100. The outer housing 101 is a feature that corresponds to the "outer housing" according to invention. The hammer bit 119 is detachably coupled to a front end region of the outer housing 101 via a cylindrical tool holder 159. The hammer bit 119 is inserted into a bit insertion hole of the tool holder 159 and held such that it is allowed to reciprocate in its axial direction relative to the tool holder 159 and prevented from rotating in its circumferential direction relative to the tool holder 159.

A handgrip 109 is designed to be held by a user and connected to an end of the outer housing 101 opposite from its front end region. The handgrip 109 is configured as a generally D-shaped main handle as viewed from the side, and includes a grip 109A which extends in a vertical direction (as viewed in FIG. 1) crossing the axial direction of the hammer bit 119 and is connected at its both ends in the extending direction to the outer housing 101. The handgrip 109 is a feature that corresponds to the "handle" according to invention.

In the first embodiment, for the sake of convenience of explanation, the side of the hammer bit 119 (left side of FIG. 1) in a longitudinal direction of the hammer drill 100 is defined as the "front side" and the side of the handgrip 109 (right side of FIG. 1) as the "rear". Further, an upper side of the hammer drill 100 of FIG. 1 is defined as the "upper side" and a lower side of the hammer drill 100 of FIG. 1 as the "lower side".

As shown in FIG. 1, an inner housing 103 and an electric motor 110 are housed in the outer housing 101. The inner housing 103 is disposed in an upper region within the outer housing 101. A motion converting mechanism 120 and a striking mechanism 140 are housed in the inner housing 103. The inner housing 103 is a feature that corresponds to the "inner housing" according to invention. The electric motor 110 for driving the motion converting mechanism 120 is housed in a lower region within the outer housing 101 such that a rotation axis of the electric motor 110 (output shaft) extends in a vertical direction generally perpendicular to a longitudinal direction of the outer housing 101 (the axial direction of the hammer bit 119). The electric motor 110 is a feature that corresponds to the "motor" according to invention. Further, the electric motor 110 is driven when a user pulls (manipulates) a trigger 109*a* disposed on the handgrip 109.

The motion converting mechanism 120 appropriately converts rotation of the electric motor 110 into linear motion and then transmits it to the striking mechanism 140, which causes to strike the hammer bit 119 leftward as viewed in FIG. 1 with respect to its axial direction via the striking mechanism 140. The motion converting mechanism 120 and the striking mechanism 140 are features that correspond to the "driving mechanism for driving the tool bit" according to invention.

The motion converting mechanism 120 converts rotation of the electric motor 110 into linear motion and then transmits it to the striking mechanism 140. The motion converting mechanism 120 is formed by a crank mechanism which is driven by the electric motor 110 and includes a crank shaft 121, a connecting rod 123 and a piston 125. The piston 125 forms a driving element for driving the striking mechanism 140. The piston 125 is disposed slidably in the same direction as the axial direction of the hammer bit within a cylinder 141. The motion converting mechanism 120 is a feature that corresponds to the "motion converting mechanism section" according to invention.

The striking mechanism 140 mainly includes a striking element in the form of a striker 143 that is slidably disposed in the cylinder 141 and an intermediate element in the form of an impact bolt 145 that is slidably disposed within the tool holder 159 and transmits kinetic energy of the striker 143 to the hammer bit 119. The cylinder 141 is disposed at the rear of the tool holder 159 coaxially with the tool holder 159. The cylinder 141 has an air chamber 141*a* partitioned by the piston 125 and the striker 143. The striker 143 is driven via an air spring action of the air chamber 141*a* by sliding movement of the piston 125, and then hits the impact bolt 145 and strikes the hammer bit 119 via the impact bolt 145. The striking mechanism 140 is a feature that corresponds to the "striking mechanism section" according to invention.

As shown in FIG. 1, a power transmitting mechanism 150 mainly includes a plurality of gears and appropriately reduces the speed of the rotation of the electric motor 110 and then transmits it to the hammer bit 119 via a final shaft in the form of the tool holder 159, which causes the hammer 119 to rotate in its circumferential direction. An engaging type clutch 151 is disposed in a power transmission path of the power transmitting mechanism 150 and transmits the rotational output of the electric motor 110 to the hammer bit 119 or interrupts the transmission. When the clutch 151 is switched to the power transmission state, the hammer bit 119 performs striking movement in its axial direction and rotation in its circumferential direction. Further, when the clutch 151 is switched to a power transmission interrupted state, the hammer bit 119 performs only striking movement.

The hammer drill 100 has an operation mode switching dial 147 on an upper surface region of the outer housing 101. By turning the operation mode switching dial 147, the operation mode is switched between a hammer mode in which an operation is performed on a workpiece by applying only an impact force in the axial direction to the hammer bit 119 and a hammer drill mode in which the operation is performed on a workpiece by applying an impact force in the axial direction and a rotating force in the circumferential direction to the hammer bit 119.

Figure 4:
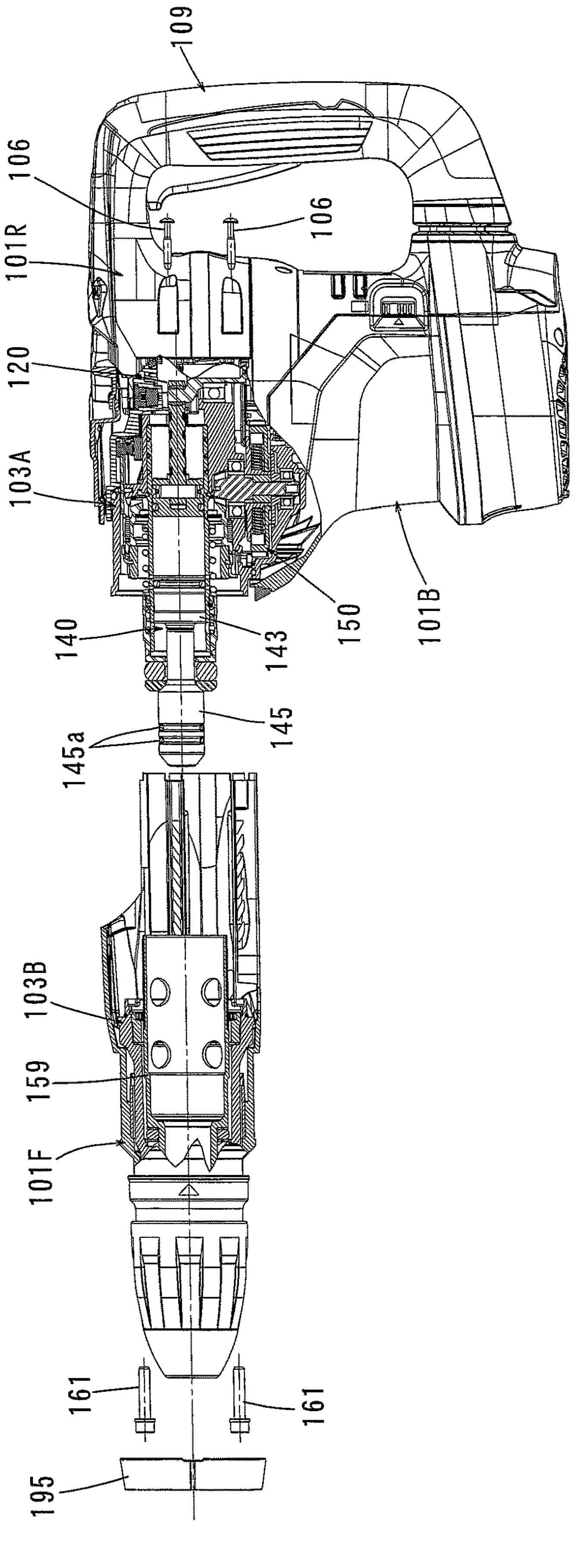
FIG. 4 is an exploded view of the hammer drill disassembled in an axial direction of a hammer bit.

As shown in FIG. 4, the inner housing 103 is provided with two parts in the longitudinal direction. Specifically, the inner housing 103 is provided with a crank housing 103A and a generally cylindrical barrel 103B disposed in front of the crank housing 103A. The crank housing 103A houses the motion converting mechanism 120 and the power transmitting mechanism 150, and the barrel 103B houses the striking mechanism 140 and a rear portion of the tool holder 159. The crank housing 103A and the barrel 103B are features that correspond to the "first inner housing" and the "second inner housing", respectively, according to invention.

Figure 3:
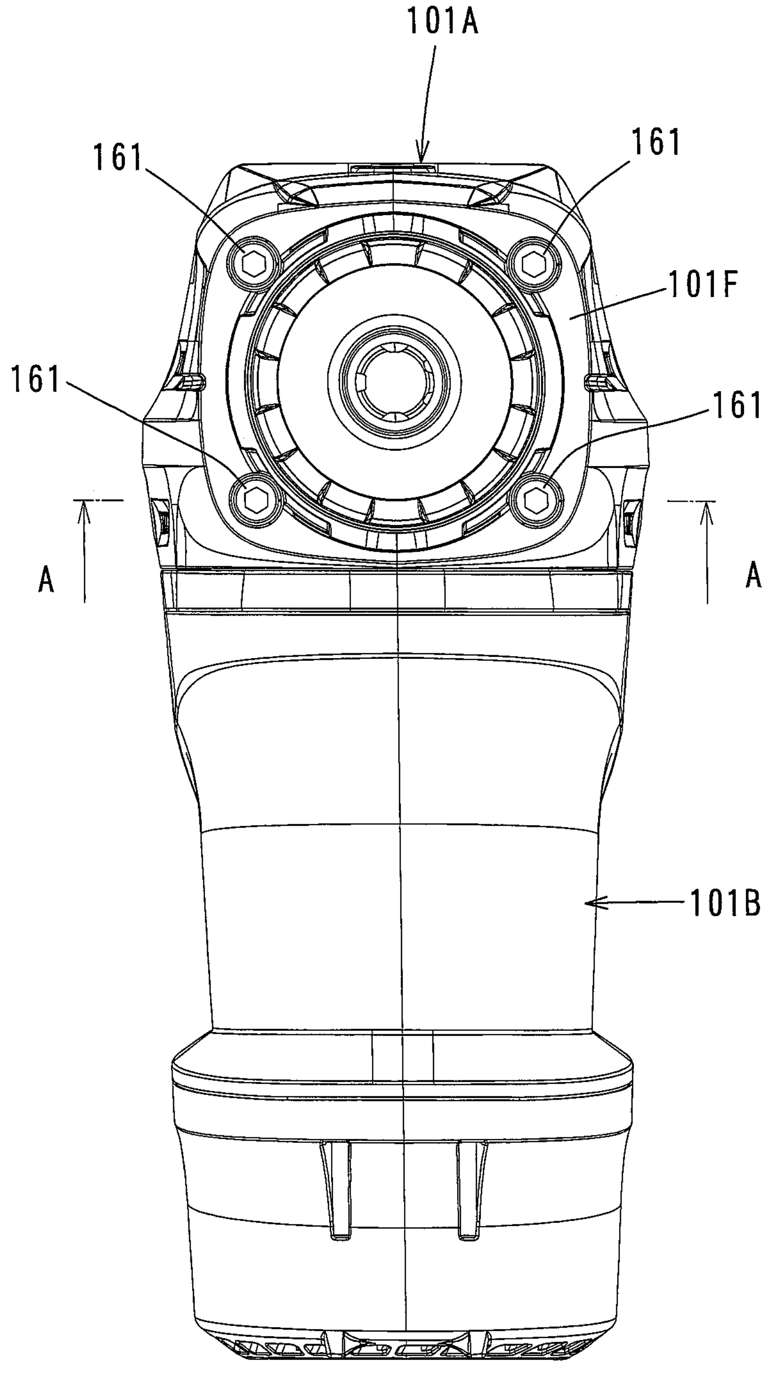
FIG. 3 is a view of the hammer drill as viewed from the front, with a dust-proof cover removed therefrom and not shown.
Figure 5:
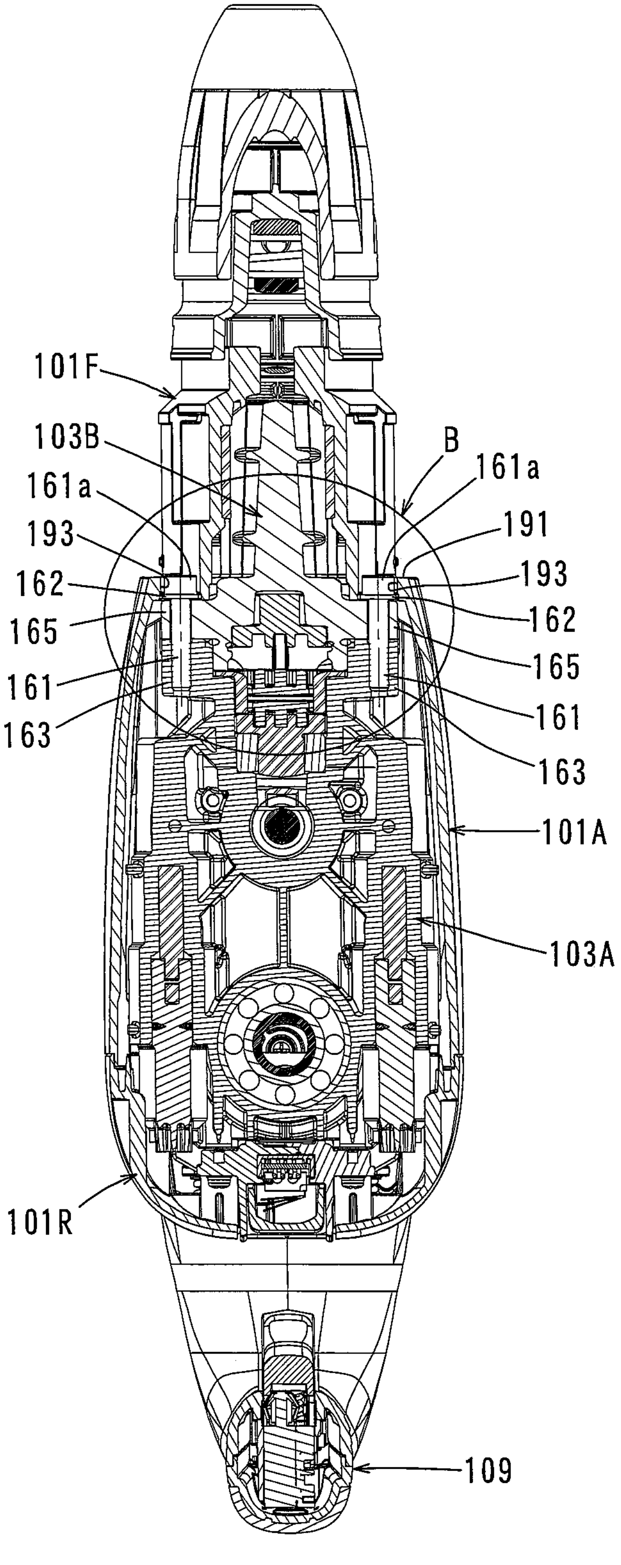
FIG. 5 is a sectional view taken along line A-A in FIG. 3.
Figure 6:
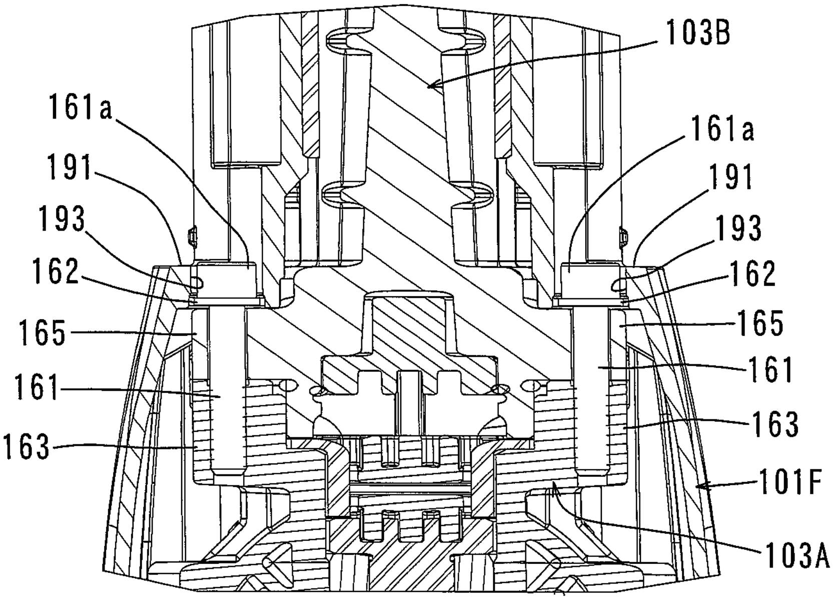
FIG. 6 is an enlarged view of part B in FIG. 5.
Figure 7:
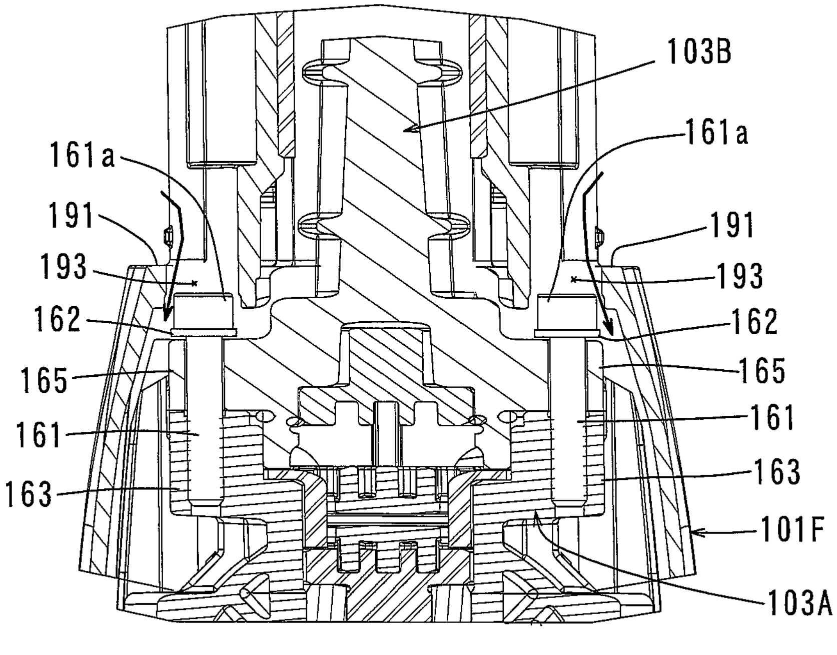
FIG. 7 is a view showing a state in which a body housing of an outer housing is moved forward relative to an inner housing.

As shown in FIGS. 5 to 7, in order to form the inner housing 103, the crank housing 103A and the barrel 103B are detachably connected to each other by four connecting bolts 161 with their joint surfaces in contact with each other. The four connecting bolts 161 are shown in FIG. 3. Specifically, as shown in FIG. 4, a front end portion of the crank housing 103A is cylindrically shaped. As shown in FIGS. 5 to 7, four threaded bosses 163 are formed at predetermined intervals in the circumferential direction of the crank housing 103A on the outer side of the front end portion of the crank housing 103A. Further, the threaded hole has a predetermined length extending rearward. A rear end portion of the barrel 103B is cylindrically shaped corresponding to the front end portion of the crank housing 103A. Four connecting flanges 165 with bolt insertion holes are formed in the circumferential direction of the rear end portion of the barrel 103B on a rear end portion of the barrel 103B. The connecting bolt 161 with a hexagonal hole is inserted into the through hole of the connecting flange 165 and screwed into the threaded hole of the threaded boss 163, with the joint surfaces of the crank housing 103A and the barrel 103B in contact with each other. Further, a washer 162 is disposed between a head 161*a* of the connecting bolt 161 and a front surface of the connecting flange 165. In this manner, the crank housing 103A and the barrel 103B are connected to each other. The connecting bolt 161 is a feature that corresponds to the "connecting member" according to invention.

As shown in FIGS. 1 and 2, the outer housing 101 is provided with a body housing 101A that houses the inner housing 103 and a motor housing 101B that houses the electric motor 110 which are disposed respectively in a vertical direction of the hammer drill 100. The body housing 101A and the motor housing 101B are features that correspond to the "first outer housing" and the "second outer housing", respectively, according to invention.

The body housing 101A of the outer housing 101 is elastically connected to the inner housing 103 and the motor housing 101B so as to be allowed to move relative to them. The motor housing 101B is disposed below the crank housing 103A of the inner housing 103 to cover a lower region of the crank housing 103A, and in this state, fastened to the crank housing 103A by fastening means (not shown) such as screws.

As shown in FIG. 4, the body housing 101A is provided with a front housing 101F and a rear housing 101R which are disposed respectively in the longitudinal direction. The front housing 101F is provided as a dust-proof cover which houses mainly the barrel 103B as a front portion of the inner housing 103. The rear housing 101R is provided as a dust-proof cover which houses mainly the crank housing 103A as a rear portion of the inner housing 103. The front housing 101F and the rear housing 101R are detachably connected to each other by a plurality of screws 106 screwed into the front housing 101F through the rear housing 101R, with their joint surfaces in contact with each other.

The handgrip 109 is formed at the rear of the rear housing 101R. As shown in FIGS. 1 and 2, the handgrip 109 is configured as a generally D-shaped handle in side view and includes the grip 109A which extends in the vertical direction crossing the axial direction of the hammer bit 119, an upper connecting region 109B which extends forward from an upper end of the grip 109A and is integrally connected to the rear housing, and a lower connecting region 109C which extends forward from a lower end of the grip 109A and is relatively movably connected to the motor housing. Specifically, the handgrip 109 is integrally formed with the rear housing 101R via the upper connecting region 109B and configured as part of the body housing 101A.

Figure 12:
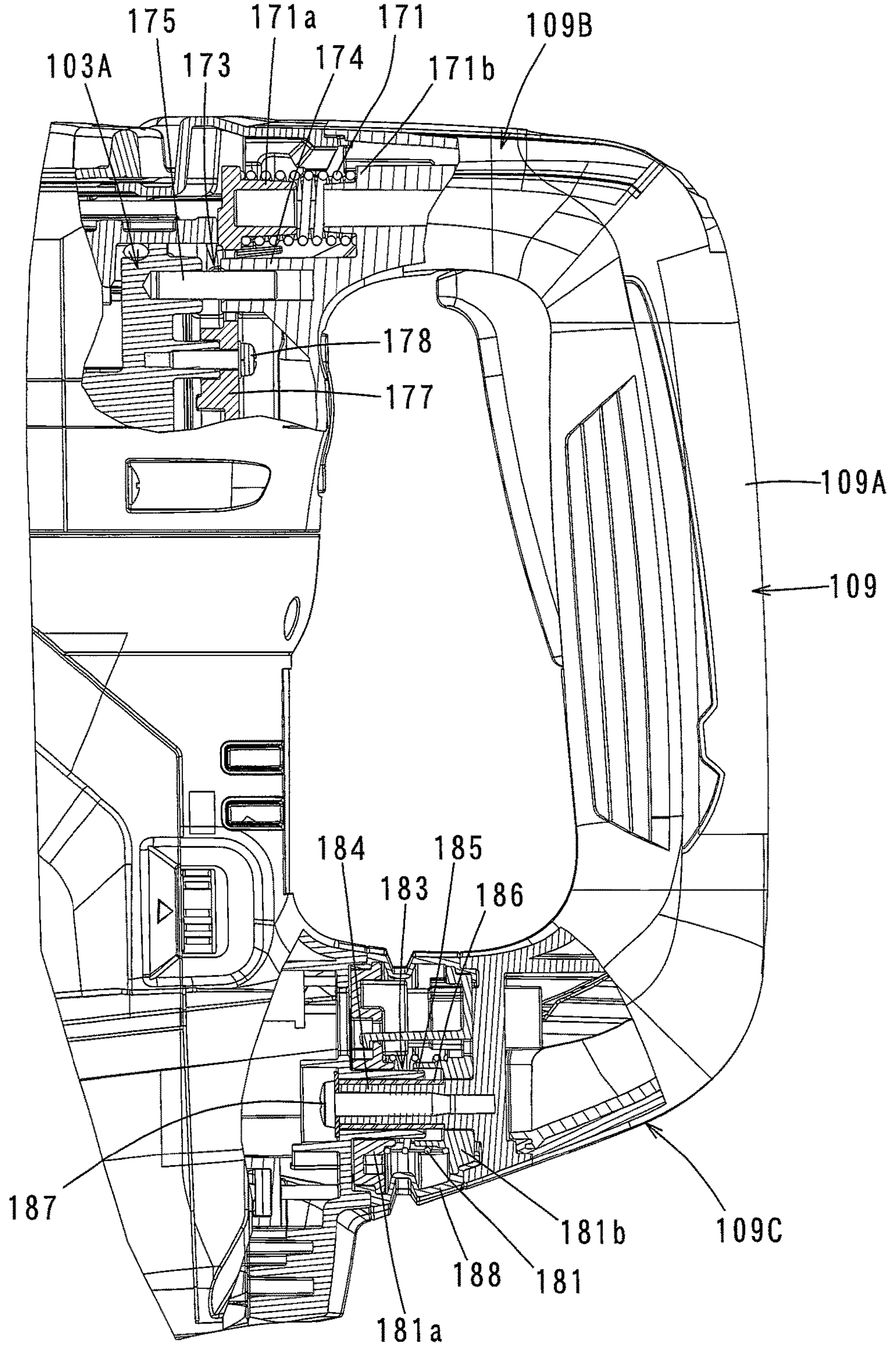
FIG. 12 is a view showing sectional structures taken along line E-E in FIG. 10 and line F-F in FIG. 11.

For the purpose of a vibration reduction, the body housing 101A is connected to the inner housing 103 via an elastic member so as to be allowed to move in the longitudinal direction of the hammer bit 119 relative to the inner housing 103. Specifically, as shown in FIG. 12, the upper connecting region 109B is elastically connected to the rear of the crank housing 103A via a first compression coil spring 171 for the vibration reduction. The lower connecting region 109C is elastically connected to the motor housing 101B via a second compression coil spring 181 for the vibration reduction. Further, as shown in FIG. 1, the front housing 101F of the body housing 101A is elastically connected to the barrel 103B via an elastic ring 189. The first compression coil spring 171 and the elastic ring 189 are features that correspond to the "elastic member" according to invention.

The body housing 101A including the handgrip 109 is elastically connected to the inner housing 103 and the motor housing 101B fastened to the inner housing 103 at three points in the upper and lower connecting regions 109B, 109C of the handgrip 109 and the front end region of the front housing 101F. With this construction, the body housing 101A is configured as a vibration-proofing housing which is elastically connected to the inner housing 103 and the motor housing 101B fastened to the inner housing 103 so as to be allowed to move relative to them in the longitudinal direction (the axial direction of the hammer bit 119).

Figure 10:
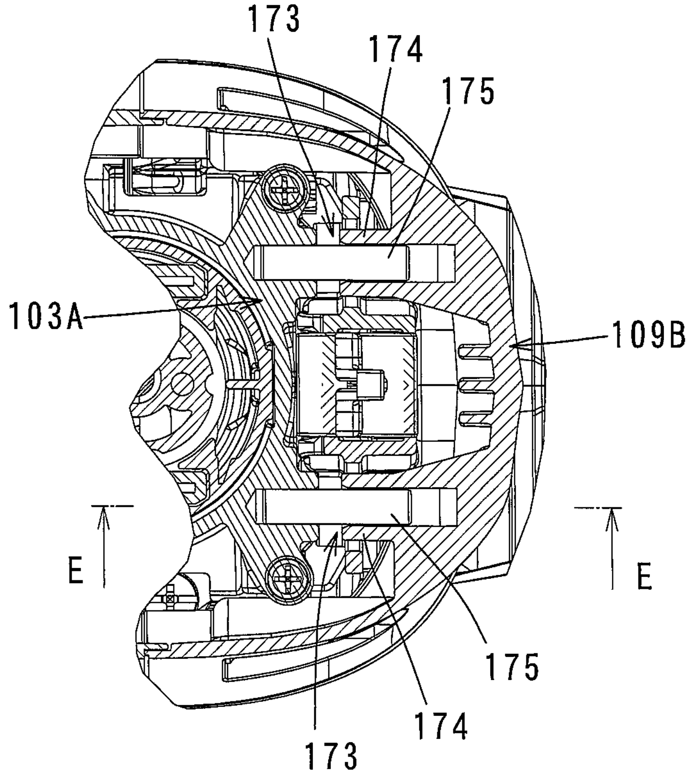
FIG. 10 is a sectional view taken along line C-C in FIG. 2.

Structures of elastically connecting parts of the outer housing 101 are now described with reference to FIGS. 10 to 12. The elastically connecting part of the upper connecting region 109B of the handgrip 109 mainly includes right and left sliding guides 173 and right and left first compression coil springs 171. As shown in FIGS. 10 and 12, the sliding guides 173 are symmetrically disposed to the axis of the hammer bit 119. Each sliding guide 173 includes a cylindrical guide 174 which is integrally formed on an inner surface of the upper connecting region 109B and protrudes straight forward, and a metal guide rod 175 which is fastened to the crank housing 103A and protrudes straight rearward. The guide rod 175 is slidably fitted into a bore of the cylindrical guide 174. By provision of this construction, the upper connecting region 109B is supported by the crank housing 103A relatively movable to the crank housing 103A in the longitudinal direction.

As shown in FIG. 12, the first compression coil springs 171 are symmetrically disposed to the axis of the hammer bit 119. Each first compression coil springs 171 is arranged such that its central axis extends generally parallel to the axial direction of the hammer bit 119. The first compression coil spring 171 is elastically disposed between a spring receiver 171*a* provided on the crank housing 103A side and a spring receiver 171*b* provided on the inner surface of the upper connecting region 109B, and applies a biasing force to the handgrip 109 in a rearward direction. The spring receiver 171*a* on the crank housing 103A side is provided on a fixed member 177 which is fastened to the crank housing 103A by a screw 178.

Figure 11:
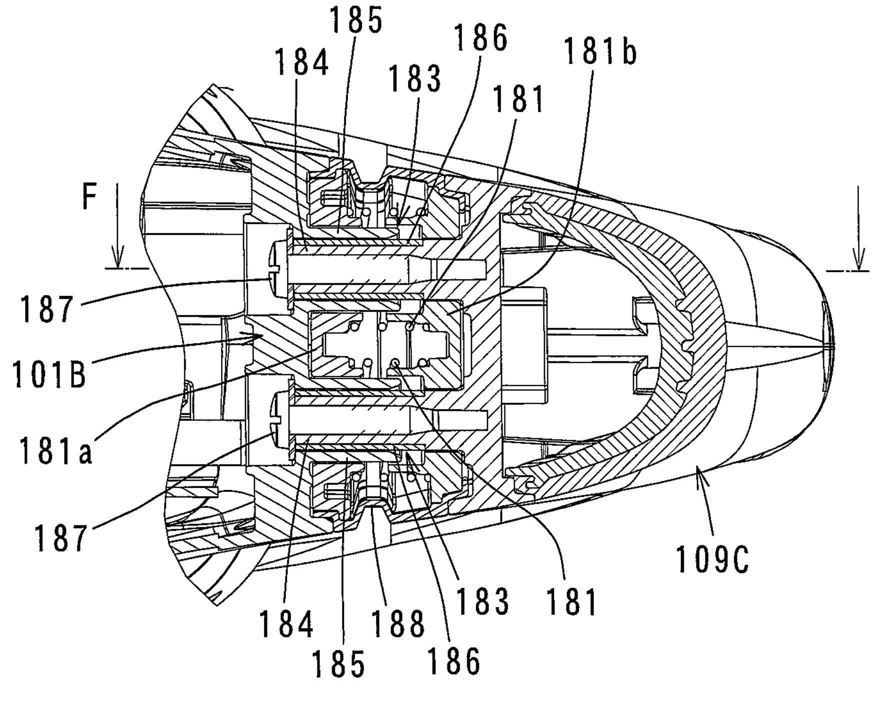
FIG. 11 is a sectional view taken along line D-D in FIG. 2.

As shown in FIGS. 11 and 12, the elastically connecting part of the lower connecting region 109C of the handgrip 109 mainly includes right and left sliding guides 183 and right and left second compression coil springs 181. The sliding guides 183 are symmetrically disposed to the axis of the hammer bit 119. Each sliding guides 183 includes a cylindrical guide rod 184 which is integrally formed on a front end surface of the lower connecting region 109C and protrudes straight forward, a cylindrical guide 185 which is formed on the rear end of the motor housing 101B and protrudes straight rearward, and a cylindrical metal sleeve 186 into which the guide rod 184 is inserted. The guide rod 184 is slidably fitted into the cylindrical guide 185 integrally with the sleeve 186. By provision of this construction, the lower connecting region 109C is supported by the motor housing 101B relatively movable to the motor housing 101B in the longitudinal direction. A screw 187 is screwed into the guide rod 184 from the front toward the rear in the longitudinal direction. When a head of the screw 187 comes in contact with a front end surface of the cylindrical guide 185, the guide rod 184 is prevented from coming out of the cylindrical guide 185.

Each second compression coil springs 181 is disposed outside the sliding guides 183 respectively coaxially to the sliding guides 183. Each second compression coil springs 181 is arranged such that its central axis extends generally parallel to the axial direction of the hammer bit 119. The second compression coil spring 181 is elastically disposed between a spring receiver 181*b* provided on the lower connecting region 109C side and a spring receiver 181*a* provided on the motor housing 101B side, and applies a biasing force to the handgrip 109 in a rearward direction.

The elastically connecting part of the lower connecting region 109C is covered by a resin or rubber elastically-deformable bellows-like member 188 which is disposed between the motor housing 101B and the lower connecting region 109C. By provision of this construction, dust is prevented from entering the elastically connecting part.

The elastically connecting part of the front end region of the front housing 101F mainly includes the elastic ring 189. The elastic ring 189 is made of rubber and disposed between the inner surface of the front end region of the front housing 101F of the outer housing 101 and the outer surface of the front end region of the barrel 103B, as shown in FIG. 1. The elastic ring 189 serves to position the body housing 101A in its radial direction (a direction crossing the axial direction of the hammer bit 119) relative to the barrel 103B. Further, the elastic ring 189 allows the body housing 101A to move relative to the barrel 103B by elastically deforming in the longitudinal direction and the radial direction, so that the elastic ring 189 functions as a position-defining member to the barrel 103 and a vibration-reduction member.

Sliding members among component parts forming the hammer drill 100 need to be replaced according to the degree of wear. A typical example of this is an O-ring 145*a* (see FIG. 4) fitted on the impact bolt 145.

In the hammer drill 100 constructed as described above, the rear housing 101R of the body housing 101A of the outer housing 101, including the handgrip 109, is elastically connected to the crank housing 103A of the inner housing 103 and the motor housing 101B of the outer housing 101. Further, the front housing 101F of the body housing 101A is elastically connected to the barrel 103B of the inner housing 103 via the elastic ring 189. Therefore, when the connection between the rear housing 101R and the front housing 101F of the body housing 101A by the screws 106 is released and then the connection between the crank housing 103A and the barrel 103B of the inner housing 103 by the connecting bolts 161 is released, the hammer drill 100 can be separated into a rear block consisting of a group of the rear housing 101R, the crank housing 103 and the motor housing 101B and a front block consisting of a group of the front housing 101F and the barrel 103B. This separated state is shown in FIG. 4. Such separation is effective for improving ease of repair or replacement of parts.

Accordingly, the connecting bolt 161 can be accessed from the outside of the outer housing 101. Specifically, as shown in FIGS. 5 to 7, the front housing 101F of the body housing 101A which houses the barrel 103B has a stepped cylindrical outer shape of a front cylindrical portion and a rear cylindrical portion whose diameter is larger than a diameter of the front cylindrical portion. A stepped surface 191 is formed between the front cylindrical portion and the rear cylindrical portion, and crossed the longitudinal direction of the hammer bit 119.

The stepped surface 191 is provided forward of the joint surfaces of the barrel 103B and the crank housing 103A. Through holes 193 for access to the connecting bolts 161 is provided on the stepped surface 191. The through hole 193 is open toward the front end of the hammer bit 119. Specifically, circular through holes 193 are formed through the stepped surface 191 in the longitudinal direction and lead from outside to inside of the front housing 101F. Each of the connecting bolts 161 with the hexagonal hole can be accessed through the through hole 193 from outside of the outer housing 101 by using a screwing tool in the form of a hexagonal rod wrench. The through hole 193 is a feature that corresponds to the "opening" according to the invention.

An operation of the hammer drill 100 is performed while applying forward pressing force to the handgrip 109 with the hammer bit 119 in contact with the workpiece. Therefore, as shown in FIG. 7, the body housing 101A of the outer housing 101 moves forward while causing the first compression coil spring 171, the second compression coil spring 181 and the elastic ring 189 of the barrel 103B to elastically deform. By the movement of the body housing 101A, the stepped surface 191 is separated from the head 161*a* of the connecting bolt 161, and a gap is caused between the head 161A and the through hole 193. Therefore, as shown by an arrow in FIG. 7, dust generated during operation may enter the outer housing 101 or the internal space of the body housing 101A through a gap (enlarged clearance) between the through hole 193 and the head 161*a*. Especially, dust may adversely affect the electric motor 110 and/or a driving mechanism. Due to the construction in which the through hole 193 is open toward the front end of the hammer bit 119, particularly in an operation in which the hammer bit 119 points upward, dust accumulates on the stepped surface 191 and is more likely to enter through the through hole 193 into the body housing 101A.

Figure 8:
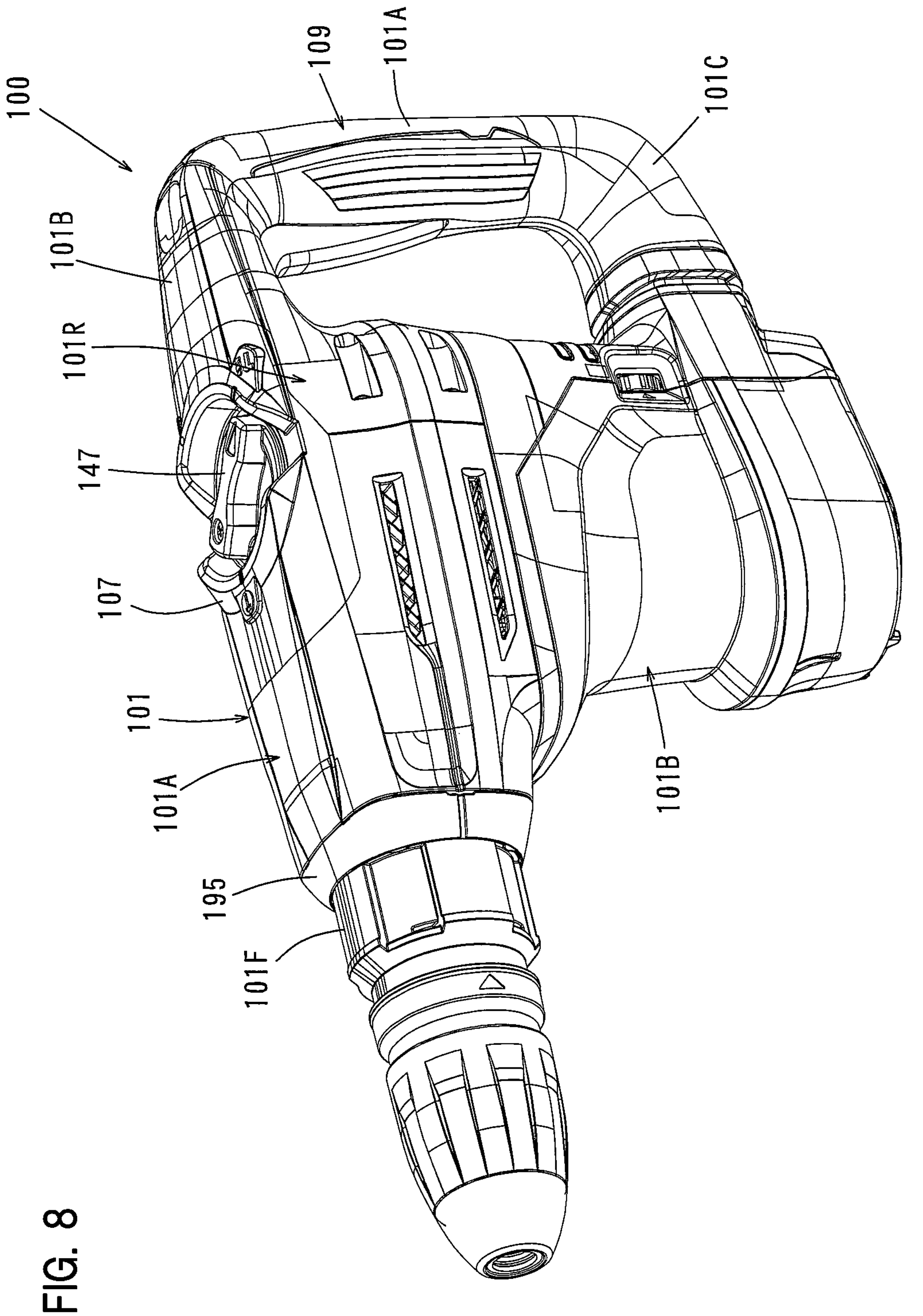
FIG. 8 is an external perspective view showing the hammer drill with the dust-proof cover mounted thereto.
Figure 9:
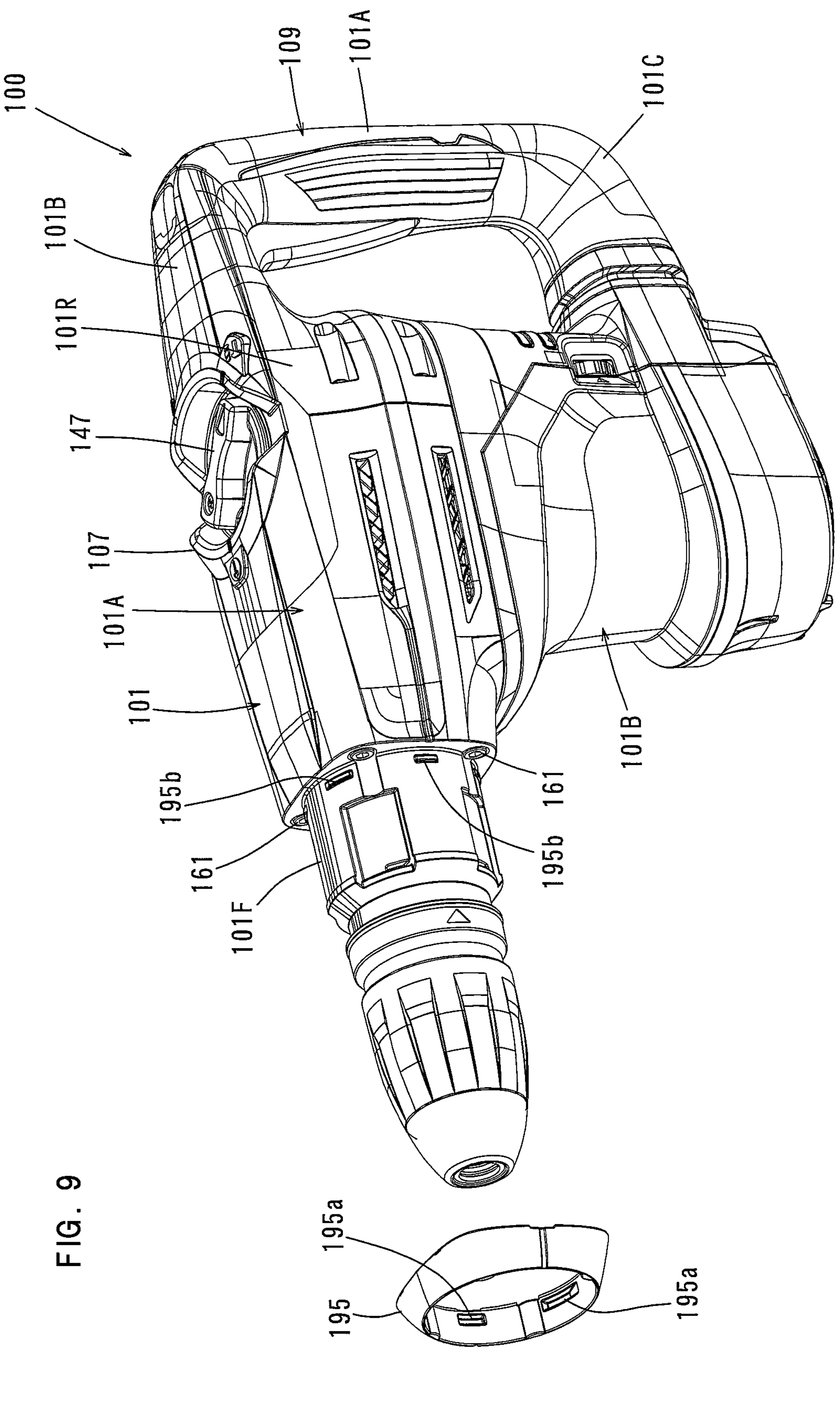
FIG. 9 is an external perspective view showing the hammer drill with the dust-proof cover removed therefrom.

Therefore, in the first embodiment, in order to avoid dust from entering the outer housing 101 through the through hole 193, a dust-proof cover 195 is provided. The dust-proof cover 195 is disposed at front region of the stepped surface 191. Thus, the through hole 193 is covered by the dust-proof cover 195 from the outside. The dust-proof cover 195 is a feature that corresponds to the "covering member" according to invention. As shown in FIG. 8, the dust-proof cover 195 is formed of synthetic resin in a ring-like shape and is mounted to the front housing 101F by fitting onto the front housing 101F from the front. As shown in FIG. 9, a plurality of recesses 195*a* are formed in the circumferential direction in an inner surface of the dust-proof cover 195. Correspondingly, a plurality of projections 195*b* are formed in the circumferential direction on an outer surface of the front housing 101F. The dust-proof cover 195 is detachably attached in a predetermined mounting position by elastic engagement between the projections 195*b* and the recesses 195*a* of the dust-proof cover 195.

As described above, according to the first embodiment, the through hole 193 for a maintenance (repair) of the hammer drill 100 is covered by the dust-proof cover 195 provided on the body housing 101A which is configured as a vibration reduction housing. Further, as the body housing 101A is configured as a vibration reduction housing, a size of the gap (clearance) between the through hole 193 and the connecting bolt 161. Therefore, dust generated during operation is prevented from entering within the outer housing 101 through the gap by the dust-proof cover 195. Thus, the electric motor 110 housed within the outer housing 101 is protected from dust while maintaining the vibration-proofing structure of the outer housing 101 and improved ease of repair.

Further, according to the first embodiment, the outer housing 101 is provided with the body housing 101A and the motor housing 101B. Accordingly, for example, the body housing 101A and the motor housing 101B may be formed of different materials or in different colors. As a result, degree of freedom in a design of the outer housing 101 is improved. Especially, in a structure in which the outer housing 101 is molded by a resin, such advantage is enhanced.

Further, according to the first embodiment, the through holes 193 are covered by the ring-like single dust-proof cover 195. Therefore, the dust-proof cover 195 is made simpler in structure compared with the construction in which the through holes 193 are individually covered by a plurality of cover members.

As shown in FIG. 1, the hammer drill 100 according to the first embodiment has the operation mode switching dial 147 on the upper surface region of the outer housing 101. Further, a metal cover 107 is provided to surround the operation mode switching dial 147 in order to protect the operation mode switching dial 147 from external impact (force). the metal cover 107 is clamped and held by the front housing 101F and the rear housing 101R from the front and the rear, when the front housing 101F and the rear housing 101R of the body housing 101A are connected by the screws 106.

Figure 13:
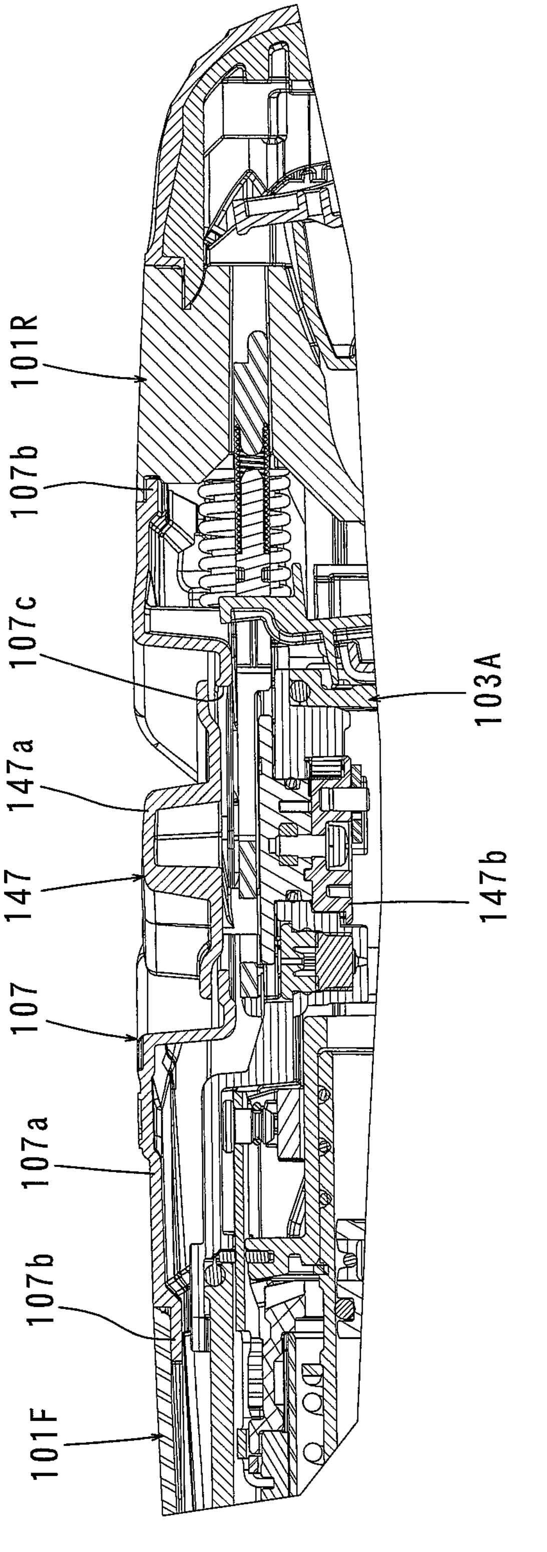
FIG. 13 is a sectional view showing mainly an operation mode switching dial and a metal cover.

Specifically, as shown in FIG. 13, the metal cover 107 has a generally circular dish-shaped form having a flange 107*a* on its upper outer peripheral edge. Further, stepped portions 107*b* are formed below the top of the flange on its front end and the rear end of the flange 107*a* of the metal cover 107 respectively. The stepped portions 107*b* are engagable with the front housing 101F and the rear housing 101R respectively. Therefore, the metal cover 107 is held and clamped by the rear housing 101R and the front housing 101F from the front and the rear.

The operation mode switching dial 147 has a tab 147*a* which is operable by a user and a shaft 147*b* which extends downward from the tab 147*a*. The shaft 147*b* is inserted into the crank housing 103A of the inner housing 103 through a through hole 107*c* which is formed through the bottom of the metal cover 107, and the shaft 147*b* is relatively rotatably supported by the crank housing 103A. The operation mode switching dial 147 fits within the metal cover 107 such that the top of the tab 147*a* doesn't protrude upward from the top of the flange 107*a* of the metal cover 107. Thus, the operation mode switching dial 147 is surrounded by the metal cover 107 so as to be protected from external impact.

Thus, according to the first embodiment, the metal cover 107 is mounted by holding between the rear housing 101R and the front housing 101F, the mounting of the metal cover 107 is made simpler. Further, as the metal cover 107 made of metal is provided with higher strength than a cover made of synthetic resin, the metal cover 107 is avoided from being damaged by interference with the ground, etc.

In the first embodiment, the plurality of through holes 193 are covered by the single dust-proof cover 195, but it is not limited to such construction. For example, it may be constructed such that each of the through holes 193 is individually covered by a plurality of dust-proof covers respectively. Further, in the first embodiment, as to the opening to be covered by the dust-proof cover 195 is explained as being the through hole 193 which is open toward the front end of the hammer bit 119, but it is not limited to such construction.

For example, like the through hole 107*c* formed in the metal cover 107, it may be constructed such that the opening is open in a direction crossing the axial direction of the hammer bit 119. Further, the dust-proof cover 195 may be made of other material than the rubber.

Second Embodiment

A second embodiment of the invention is now described with reference to FIGS. 14 to 22. Constructions which are similar to the first embodiment are numbered by the same reference numeral as the first embodiment and omitted to describe. The object of the second embodiment is, in addition to the object to the first embodiment, improving construction of sliding surfaces of housings which are slid to each other in a contact manner.

Figure 14:
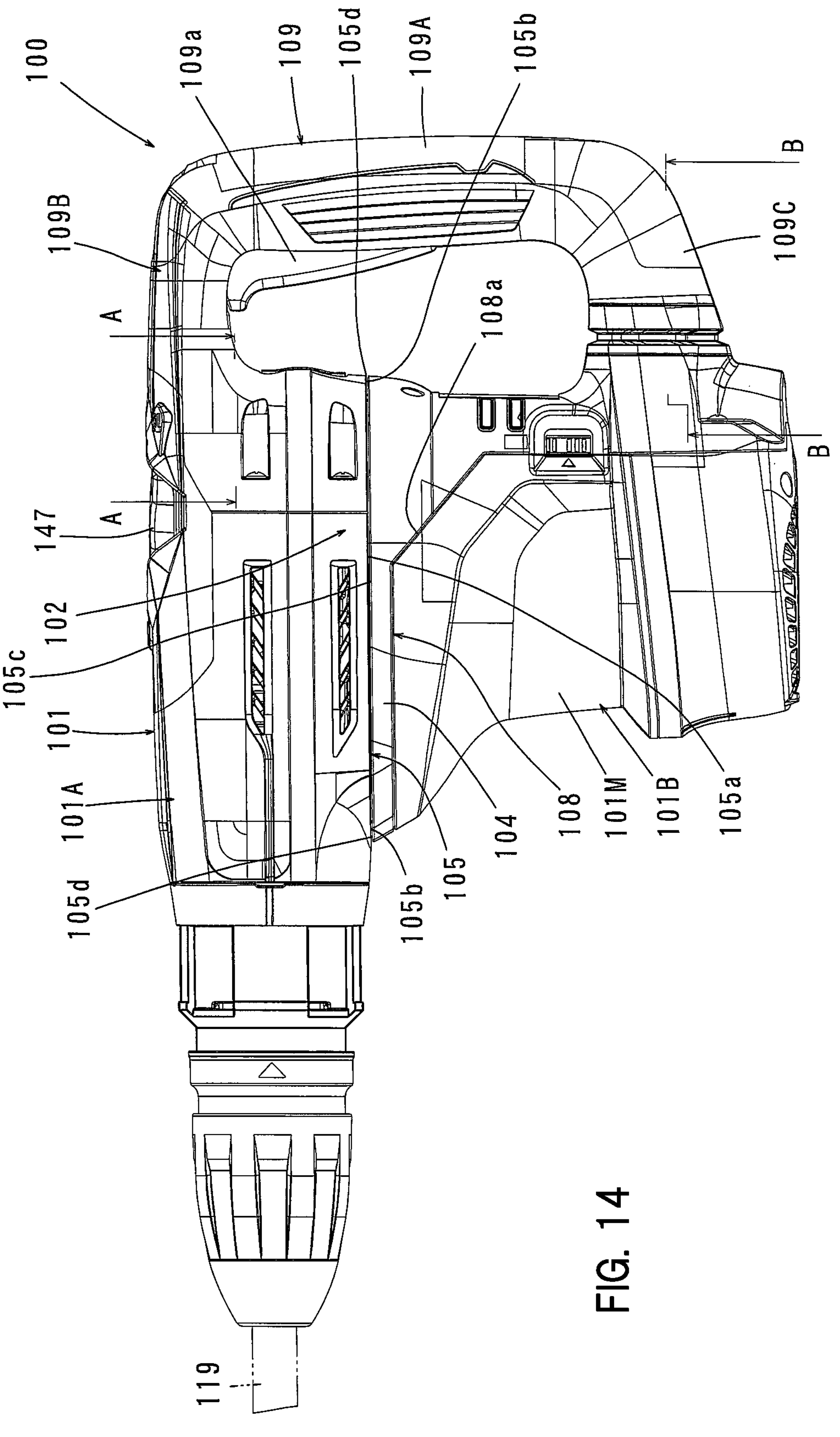
FIG. 14 is an external view showing a hammer drill according to a second embodiment.
Figure 15:
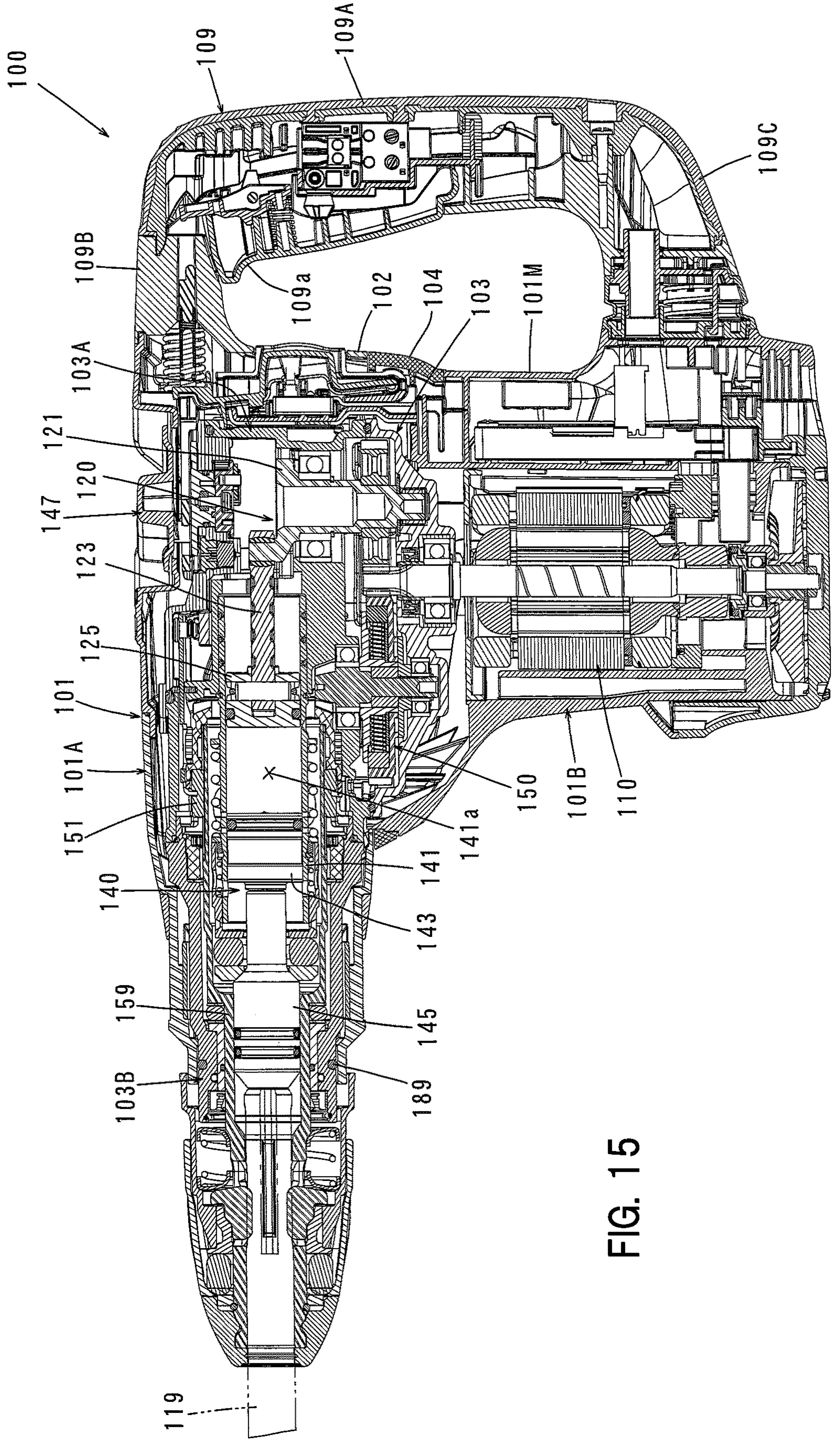
FIG. 15 is a sectional view showing the entire hammer drill.

As shown in FIG. 14, the body housing 101A includes a lower region 102. Further, the motor housing 101B is provided with a main housing 101M and an upper region 104. The body housing 101A and the motor housing 101B are disposed such that a lower surface of the lower portion 102 and an upper surface of the upper region 104 are contacted with each other. The power region 102 of the body housing 101A and the upper region 104 of the motor housing 101B are formed as a substantially rectangular shape which is long in the front-rear direction in the section crossing the output shaft of the electric motor 101 (in a plan view). Accordingly, in the body housing 101A, an opening which is formed and surrounded by the lower region 102 is provided. Further, in the motor housing 101B, an opening which is formed and surrounded by the upper region 104 is provided. The body housing 101A and the motor housing 101B are features that correspond to the "first housing" and the "second housing", respectively, according to the invention. The lower region 102 of the body housing 101A and the upper region 104 of the motor housing 101B are features that correspond to the "first contact region" and the "second contact region", respectively, according to the invention. Further, the upper region 104 and the main housing 101M are features that correspond to the "first member" and the "second member", respectively, according to the invention.

Figure 16:
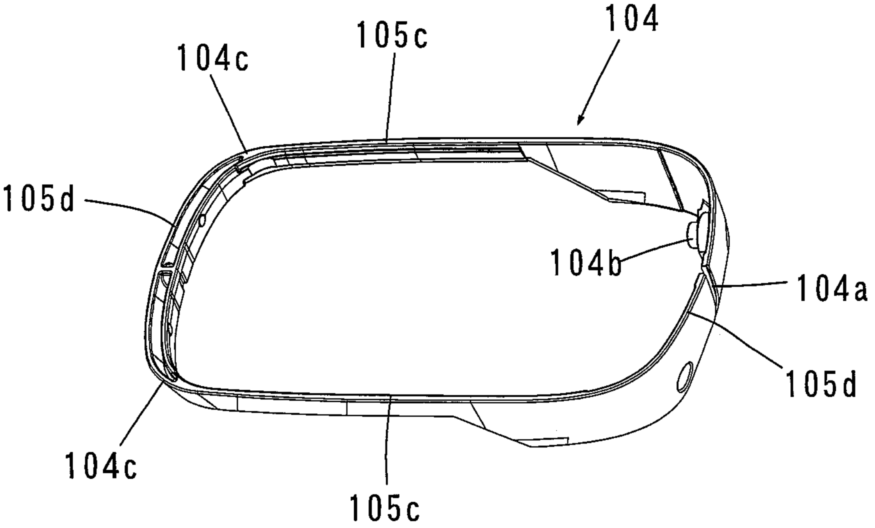
FIG. 16 is a perspective view showing a ring-like member.
Figure 17:
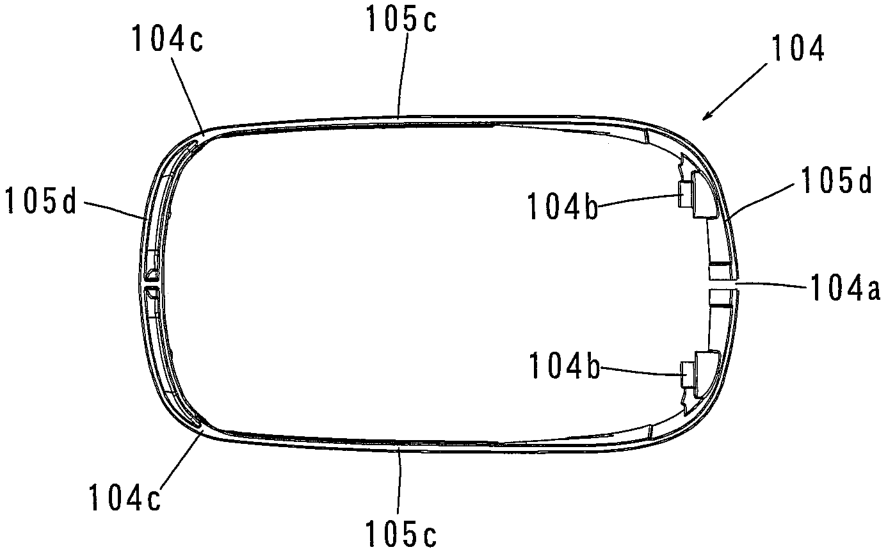
FIG. 17 is a plan view showing the ring-like member.
Figure 18:
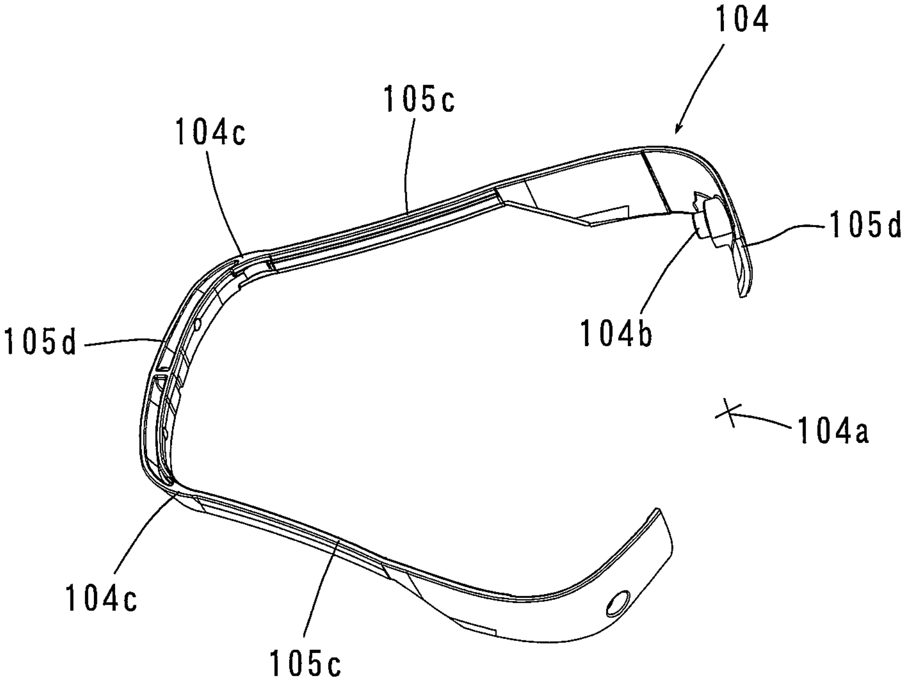
FIG. 18 is a perspective view showing the ring-like member opened outward.
Figure 19:
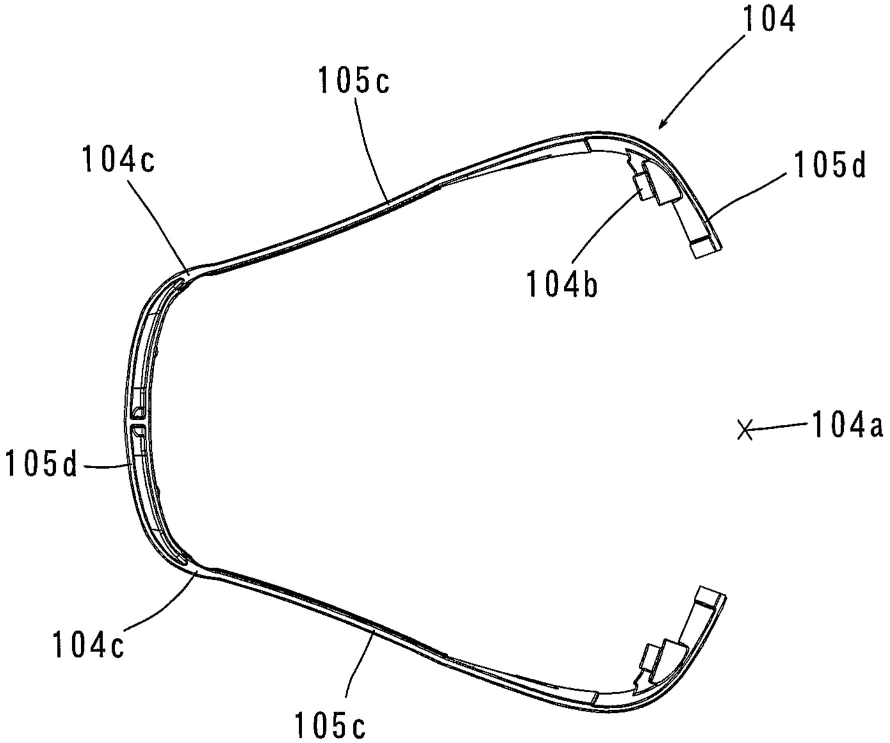
FIG. 19 is a plan view showing the ring-like member opened outward.

As shown in FIGS. 16 and 17, the upper region 104 is formed by a ring-like member having a generally rectangular shape in a plan view which is long in the front-rear direction. Further, the upper region 104 has a cut 104*a* at the rear. Specifically, the upper region 104 is configured to have a cut at one point in the circumferential direction of the ring. The cut 104*a* is disposed at a rear side of the hammer drill 100 so as to face the hand grip 109. As shown in FIGS. 18 and 19, the upper region 104 can be opened outward from the cut 104*a* by its own elastic deformation. Namely, the upper region 104 is opened around front corners 104*c* on the side opposite from the cut 104*a* as a pivot in the lateral direction crossing the front-rear direction. Further, inwardly protruding, generally cylindrical engagement protrusions 104*b* are formed on lateral end portions of upper region 104 on opposite sides of the cut 104*a*.

Therefore, as shown in FIGS. 18 and 19, the upper region 104 is opened outward from the cut 104*a* and horizontally moved from the front to the rear of the hammer drill 100 so as to be fitted onto an outer peripheral portion of an upper end of the main housing 101M of the motor housing 101B. Thereafter, the upper region 104 can be mounted to the outer peripheral portion of the upper end of the main housing 101M in such a manner as to be wrapped therearound by elastic recovery. At this time, the engagement protrusions 104*b* are elastically engaged with engagement recesses (not shown) formed in the main housing 101M. Specifically, the upper region 104 is detachably attached to the main housing 101M.

As shown in FIGS. 16 and 17, a generally rectangular upper surface of the upper region 104 is flat in a horizontal direction and this upper surface gets in surface contact with a lower surface of the lower region 102 of the body housing 101A. Specifically, as shown in FIG. 14, in a facing region 105 of the lower region 102 of the body housing 101A and the upper region 104, sliding surfaces extending in the circumferential direction are formed respectively. More specifically, as shown in FIG. 14, the lower region 102 of the body housing 101A has right and left sliding surfaces 105*a* extending in the axial direction of the hammer bit 119 and front and rear sliding surfaces 105*b* extending in a direction crossing the axial direction of the hammer bit 119. Further, the upper region 104 has right and left sliding surfaces 105*c* extending in the axial direction of the hammer bit 119 and front and rear sliding surfaces 105*d* extending in a direction crossing the axial direction of the hammer bit 119. The right and left sliding surfaces 105*a* and front and rear sliding surfaces 105*b* of the lower region 102 are features that correspond to the "first extending surface" and the "second extending surface", respectively, according to the invention. Further, the right and left sliding surfaces 105*c* and front and rear sliding surfaces 105*d* of the upper region 104 are features that correspond to the "third extending surface" and the "fourth extending surface", respectively, according to the invention.

As shown in FIG. 14, when the upper region 104 is mounted to the outer periphery of the upper end of the main housing 101M, inclined region 108*a* is formed in rear portions of the facing region 108 of the main housing 101M and the upper region 104, and inclined downward and rearward. Specifically, in the inclined region 108*a*, inclined surfaces of the main housing 101M and the upper region 104 are engaged with each other, so that the upper region 104 is prevented from moving forward.

Figure 20:
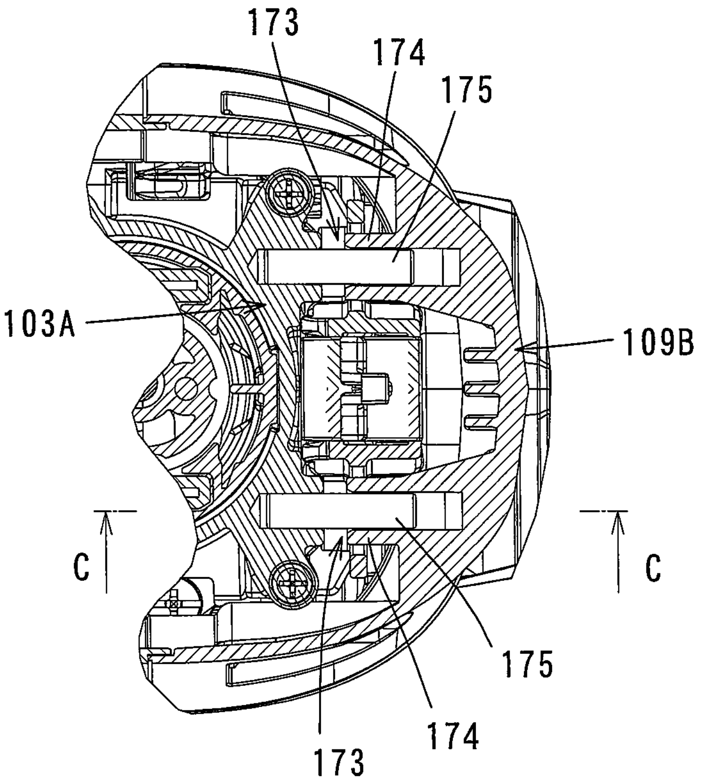
FIG. 20 is a sectional view taken along line A-A in FIG. 14.
Figure 21:
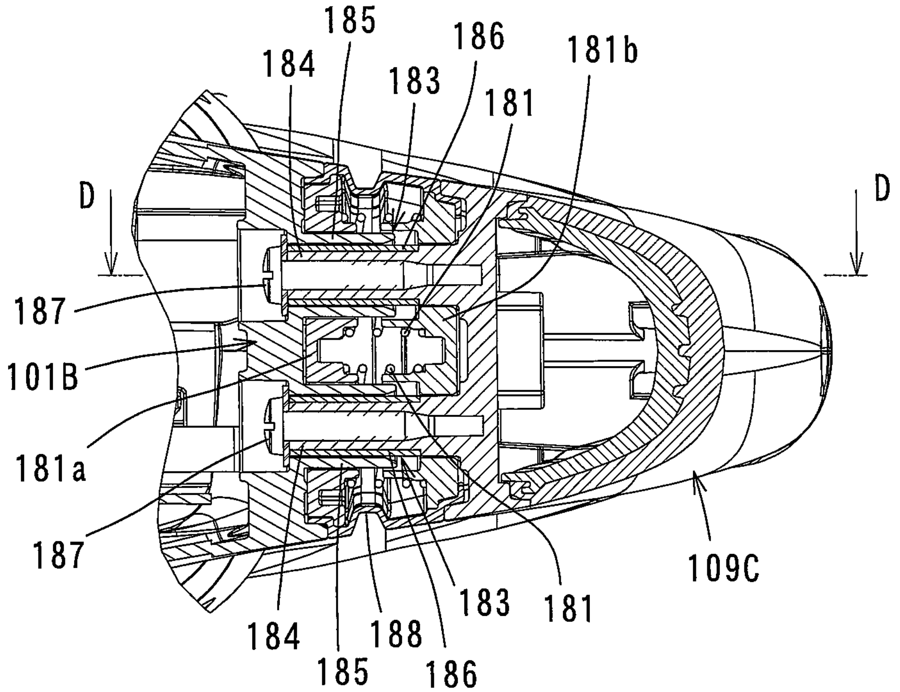
FIG. 21 is a sectional view taken along line B-B in FIG. 14.
Figure 22:
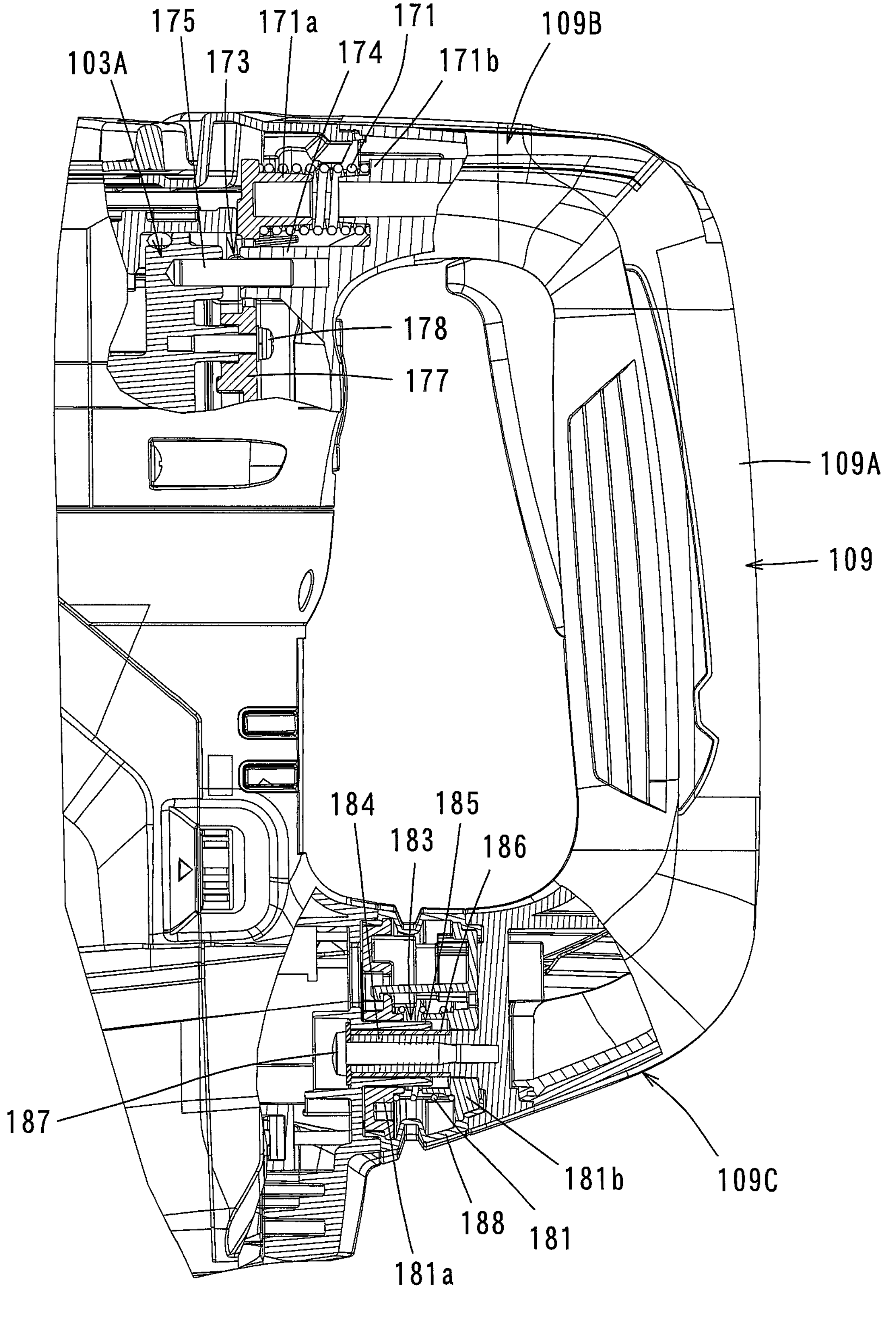
FIG. 22 is a sectional view taken along line C-C in FIG. 20 and line D-D in FIG. 21.

As shown in FIGS. 20 to 22, structures of elastically connecting parts of the outer housing 101 are similar to the structures described in the first embodiment. Accordingly, the guide rod 175 and the cylindrical guide 174 of the handgrip 109 are features that correspond to the "first guide member" and the "second guide member", respectively, according to the invention.

In the second embodiment, the body housing 101A configured as the vibration-proofing housing and the main housing 101M of the motor housing 101B in the outer housing 101 are both formed of polyamide resin. On the other hand, the upper region 104 is formed of a material different from polyamide resin, for example, any one of polycarbonate resin, polyacetal resin, iron, magnesium, aluminum and stainless. Further, the upper region 104 is preferably formed of a material having a higher melting point than polyamide resin. Further, the handgrip 109 is formed of the same polyamide resin as the body housing 101A.

Impulsive and cyclic vibration is caused in the hammer drill 100 in the axial direction of the hammer bit 119 during operation. By this vibration, in the facing region 105, the body housing 101A and the motor housing 101B are caused to relatively slide in the longitudinal direction while being kept in contact with each other, so that friction heat is generated on the sliding surfaces. In the second embodiment, the body housing 101A as one of the members having the sliding surfaces is formed of polyamide resin, and the upper region 104 as the other member is formed of a different material from polyamide resin. With this construction, the sliding surfaces of the facing region 105 of the body housing 101A and the motor housing 101B can be prevented from being welded by friction heat generated during vibration.

According to the second embodiment, the sliding surfaces of the body housing 101A and the upper region 104 of the motor housing 101B are formed in the substantially entire circumferential direction. With this construction, the sliding surfaces can have a large area, so that sliding movement of the body housing 101A relative to the upper region 104 can be stabilized and wear of the sliding surfaces of the body housing 101A and the upper region 104 can be reduced.

According to the second embodiment, the upper region 104 is opened outward at the cut 104*a* side by utilizing its own elastic deformation, and in this state, fitted onto the main housing 101M. With this construction, the upper region 104 can be mounted to the main housing 101M afterward and easily replaced with new one as necessary.

According to the second embodiment, in the elastically connecting part of the upper connecting region 109B of the handgrip 109, the cylindrical guide 174 of the handgrip 109 is formed of polyamide resin and the guide rod 175 of the crank housing 103A is formed of metal. With this construction, even if friction heat is generated on the sliding surfaces of the cylindrical guide 174 and the guide rod 175, the sliding surfaces can be prevented from being welded by friction heat.

According to the second embodiment, in the elastically connecting part of the lower connecting region 109C of the handgrip 109, the cylindrical guide 185 of the motor housing 101B is formed of polyamide resin and the sleeve 186 fixed to the handgrip 109 is formed of metal. With this construction, even if friction heat is generated on the sliding surfaces of the cylindrical guide 185 and the sleeve 186, the sliding surfaces can be prevented from being welded by friction heat.

In the second embodiment, the body housing 101A and the main housing 101M of the motor housing 101B are described as being formed of polyamide resin and the upper region 104 is described as being formed of any one of polycarbonate resin, polyacetal resin, iron, magnesium, aluminum and stainless, but the invention is not limited to such a construction. For example, the body housing 101A and the main housing 101M of the motor housing 101B may be formed of any one of polycarbonate resin, polyacetal resin, iron, magnesium, aluminum and stainless and the upper region 104 may be formed of polyamide resin. In other words, the body housing 101A and the upper region 104 which are slidably held in contact with each other may be formed of different materials selected among the above-described materials.

In the second embodiment, the motor housing 101B is described as being provided with the main housing 101M and the upper region 104, but the invention is not limited to such a construction. Specifically, it may be constructed such that the motor housing 101B is formed by a single member and one of the body housing 101A and the motor housing 101B is formed of polyamide resin and the other is formed of any one of polycarbonate resin, polyacetal resin, iron, magnesium, aluminum and stainless. Further, in the second embodiment, the upper region 104 is described as having a cut, but it may be constructed to be a ring-like member without a cut. Even in such a construction, the effect of preventing the sliding surfaces of the body housing 101A and the upper region 104 from being welded can also be obtained.

In the first and the second embodiment, the body housing 101A of the outer housing 101 is described as being a vibration-proofing housing which is elastically connected to the inner housing 103A, but it is not limited to such construction. For example, the outer housing 101 may not be configured as a vibration-proofing housing. In this case, the handgrip 109 is preferably configured as a vibration-proofing handle elastically connected to the outer housing 101.

In the first and the second embodiment, the hammer drill 100 is described as a representative example of the impact tool, but the invention may be applied to a hammer which causes the hammer bit 119 to perform only striking movement in its axial direction.

In view of the scope and spirit of the above-described invention, the impact tool of the invention can be provided to have following features. The each feature may be utilized independently or by being incorporated into claimed invention.

(1)

"The second housing is formed of a material selected from a group of polycarbonate resin, polyacetal resin, iron, magnesium, aluminum and stainless."

(2)

"The impact tool as defined in (1), wherein the first housing is formed of polyamide resin."

(3)

"The first member is formed of a material selected from a group of polycarbonate resin, polyacetal resin, iron, magnesium, aluminum and stainless."

(4)

"The impact tool as defined in (3), wherein the second member is formed of polyamide resin."

(5)

"The first housing is elastically connected to a second housing via an elastic member."

(6)

"The inner housing is connected to the second housing such that it cannot move relative to the second housing."

Correspondences Between the Features of the Embodiment and the Features of the Invention The relationship between the features of the embodiment and the features of the invention and matters used to specify the invention are as follows. Naturally, each feature of the embodiment is only an example for embodiment relating to the corresponding matters to specify the invention, and each feature of the present invention is not limited to this.

The hammer bit 119 is a feature that corresponds to the "tool bit" according to invention.

The motion converting mechanism 120 and the striking mechanism 140 are features that correspond to the "driving mechanism" according to invention.

The motion converting mechanism 120 is a feature that corresponds to the "motion converting mechanism section" according to invention.

The striking mechanism 140 is a feature that corresponds to the "striking mechanism section" according to invention.

The electric motor 110 is a feature that corresponds to the "electric motor" according to invention.

The outer housing 101 is a feature that corresponds to the "outer housing" according to invention.

The body housing 101A is a feature that corresponds to the "first outer housing" according to invention.

The motor housing 101B is a feature that corresponds to the "second outer housing" according to invention.

The inner housing 103 is a feature that corresponds to the "inner housing" according to invention.

The crank housing 103A is a feature that corresponds to the "first inner housing" according to invention.

The barrel 103B is a feature that corresponds to the "second inner housing" according to invention.

The through hole 193 is a feature that corresponds to the "opening" according to invention.

The dust-proof cover 195 is a feature that corresponds to the "covering member" according to invention.

The first compression coil spring 171 and the elastic ring 189 are features that correspond to the "elastic member" according to invention.

The handgrip 109 is a feature that corresponds to the "handle" according to invention.

The connecting bolt 161 is a feature that corresponds to the "connecting member" according to invention.

The outer housing 101 is a feature that corresponds to the "housing" according to the invention.

The body housing 101A is a feature that corresponds to the "first housing" according to the invention.

The motor housing 101B is a feature that corresponds to the "second housing" according to the invention.

The lower region 102 is a feature that corresponds to the "first contact region" according to the invention.

The upper region 104 is a feature that corresponds to the "second contact region" according to the invention.

The upper region 104 of the motor housing 101B is a feature that corresponds to the "first member" according to the invention.

The main housing 101M of the motor housing 101B is a feature that corresponds to the "second member" according to the invention.

The sliding surface 105*a* of the lower region 102 is a feature that corresponds to the "first extending surface" according to the invention.

The sliding surface 105*b* of the lower region 102 is a feature that corresponds to the "second extending surface" according to the invention.

The sliding surface 105*c* of the upper region 104 is a feature that corresponds to the "third extending surface" according to the invention.

The sliding surface 105*d* of upper region 104 is a feature that corresponds to the "fourth extending surface" according to the invention.

The guide rod 175 is a feature that corresponds to the "first guide member" according to the invention.

The cylindrical guide 174 of the handgrip 109 is a feature that corresponds to the "second guide member" according to the invention.

The sleeve 186 is a feature that corresponds to the "third guide member" according to the invention.

The cylindrical guide 185 of the motor housing 101B is a feature that corresponds to the "fourth guide member", respectively, according to the present invention.

DESCRIPTION OF NUMERALS

100 hammer drill
101 outer housing
101A body housing
101B motor housing
101F front housing
101R rear housing
103 inner housing
103A crank housing
103B barrel
104 upper region
104*a* cut
104*b* engagement protrusion
104*c* corner
105 facing region
105*a* sliding surface
105*b* sliding surface
105*c* sliding surface
105*d* sliding surface
106 screw
107 metal cover
107*a* flange
107*b* stepped portion
107*c* through hole
108 facing region
108*a* inclined region
109 handgrip
109A grip
109B upper connecting region
109C lower connecting region
109*a* trigger
110 electric motor
120 motion converting mechanism
121 crank shaft
123 connecting rod
125 piston
140 striking mechanism
141 cylinder
141*a* air chamber
143 striker
145 impact bolt
145*a* O-ring
147 operation mode switching dial
147*a* tab
147*b* shaft
150 power transmitting mechanism
151 clutch
159 tool holder
161 connecting bolt
161*a* head
162 washer
163 threaded boss
165 connecting flange
171 first compression coil spring
171*a*, 171*b* spring receiver
173 sliding guide
174 cylindrical guide
175 guide rod
177 fixed member
178 screw
181 second compression coil spring
181*a*, 181*b* spring receiver
183 sliding guide
184 guide rod
185 cylindrical guide
186 sleeve
187 screw
188 bellows-like member
189 elastic ring
191 stepped surface
193 through hole
195 dust-proof cover
195*a* recess
195*b* projection

The invention claimed is:

1. An impact tool, which performs a hammering operation on a workpiece by at least linear movement of a tool bit in an axial direction of the tool bit, comprising:

a driving mechanism that drives the tool bit, an electric motor that drives the driving mechanism, and a housing that forms an outer shell of the impact tool, wherein:

the housing has a first housing that houses the driving mechanism and a second housing that houses the electric motor, the first housing has a first contact region for contact with the second housing, and the second housing has a second contact region for contact with the first housing, the first contact region and the second contact region are slidable relative to each other during the hammering operation, and the first contact region and the second contact region are formed of different materials to each other.

2. The impact tool as defined in claim 1, wherein the second housing includes a first member that forms the second contact region, and a second member that houses the motor.

3. The impact tool as defined in claim 2, wherein the first member comprises a ring-like member having a cut.

4. The impact tool as defined in claim 2, wherein:

the second member of the second housing surrounds and houses the electric motor, and the first member is fitted onto an outer peripheral portion of an upper end of the second member.

5. The impact tool as defined in claim 2, wherein the first member is formed of a material selected from a group of polycarbonate resin, polyacetal resin, iron, magnesium, aluminum and stainless.

6. The impact tool as defined in claim 5, wherein the second member is formed of polyamide resin.

7. The impact tool as defined in claim 1, comprising an inner housing that houses the driving mechanism, and an elastic member that is disposed between the first housing and the inner housing, wherein the inner housing is housed in the first housing, and the first housing is connected to the inner housing via the elastic member so as to be allowed to move relative to the inner housing.

8. The impact tool as defined in claim 7, wherein the inner housing has a first guide member, the first housing has a second guide member that is slidable relative to the first guide member, and the first guide member and the second guide member are formed of different materials to each other.

9. The impact tool as defined in claim 7, wherein the inner housing is connected to the second housing such that the inner housing cannot move relative to the second housing.

10. The impact tool as defined in claim 1, wherein the first contact region has a first extending surface that extends in the axial direction of the tool bit and a second extending surface that extends in a direction crossing the axial direction, the second contact region has a third extending surface that extends in the axial direction of the tool bit and a fourth extending surface that extends in a direction crossing the axial direction, and wherein the first housing and the second housing are disposed such that the first extending surface and the third extending surface slide relative to each other, and the second extending surface and the fourth extending surface slide relative to each other.

11. The impact tool as defined in claim 1, wherein the first housing has a third guide member, the second housing has a fourth guide member that is slidable relative to the third guide member, and the third guide member and the fourth guide member are formed of different materials to each other.

12. The impact tool as defined in claim 1, wherein:

the first contact region includes a first contact surface and the second contact region includes a second contact surface that is in contact with the first contact surface, and the first contact surface and the second contact surface extend in a direction that is parallel to an axis of the tool bit and are slidable relative to each other in the direction that is parallel to the axis of the tool bit.

13. The impact tool as defined in claim 12, wherein:

an output axis of the electric motor crosses the axis of the tool bit and defines an up-down direction of the impact tool, the electric motor is disposed on a lower side of the driving mechanism, and the first contact surface is a lower surface of the first contact region and the second contact surface is an upper surface of the second contact region.

14. The impact tool as defined in claim 13, wherein the first contact surface is a lower surface of the first housing and the second contact surface is an upper surface of the second housing.

15. The impact tool as defined in claim 1, wherein the second housing is formed of a material selected from a group of polycarbonate resin, polyacetal resin, iron, magnesium, aluminum and stainless.

16. The impact tool as defined in claim 15, wherein the first housing is formed of polyamide resin.

17. The impact tool as defined in claim 1, wherein the first housing is elastically connected to the second housing via an elastic member.

* * * * *